United States Patent
Tajima

(10) Patent No.: US 11,755,623 B2
(45) Date of Patent: Sep. 12, 2023

(54) ESTIMATION DEVICE, ESTIMATION METHOD, AND NON-TRANSITORY COMPUTER-READABLE RECORDING MEDIUM

(71) Applicant: Yahoo Japan Corporation, Tokyo (JP)

(72) Inventor: Akira Tajima, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 449 days.

(21) Appl. No.: 15/908,043

(22) Filed: Feb. 28, 2018

(65) Prior Publication Data
US 2018/0300389 A1    Oct. 18, 2018

(30) Foreign Application Priority Data
Apr. 18, 2017    (JP) ................................. 2017-082019

(51) Int. Cl.
| G06F 16/28 | (2019.01) |
| G06Q 50/00 | (2012.01) |
| G06Q 30/02 | (2023.01) |

(52) U.S. Cl.
CPC ........... *G06F 16/285* (2019.01); *G06Q 30/02* (2013.01); *G06Q 50/01* (2013.01)

(58) Field of Classification Search
CPC ....... G06F 16/285; G06Q 30/02; G06Q 50/01
See application file for complete search history.

(56) References Cited

U.S. PATENT DOCUMENTS

| 2001/0013009 A1* | 8/2001 | Greening | G06Q 30/0201 705/7.14 |
| 2006/0206379 A1* | 9/2006 | Rosenberg | G06Q 30/02 705/14.54 |
| 2011/0112994 A1* | 5/2011 | Goto | G06Q 30/02 706/12 |
| 2014/0344270 A1* | 11/2014 | Lambert | G06Q 10/067 707/737 |
| 2017/0030726 A1* | 2/2017 | French | G01C 21/3461 |
| 2017/0228752 A1* | 8/2017 | Buckman | G06Q 30/0267 |
| 2018/0232641 A1* | 8/2018 | Bostick | H04L 67/565 |

FOREIGN PATENT DOCUMENTS

| JP | 2013-171500 A | 9/2013 |
| JP | 2013-218485 A | 10/2013 |
| JP | 2015-184763 A | 10/2015 |

OTHER PUBLICATIONS

Jan. 26, 2021 Office Action issued in Japanese Patent Application No. 2017-082019.

* cited by examiner

*Primary Examiner* — Charles D Adams
(74) *Attorney, Agent, or Firm* — Oliff PLC

(57) ABSTRACT

An estimation device according to the present application includes an acquiring unit and an estimation unit. The acquiring unit acquires user relationship information indicating a similarity relationship between a plurality of users. The estimation unit estimates, based on feeling information on a similar user who is similar to one of the users in the user relationship information acquired by the acquiring unit, a feeling of the one of the users.

12 Claims, 11 Drawing Sheets

FIG.4

| USER ID | AGE | GENDER | HOME | WORK LOCA-TION | ACTION INFORMATION ||||  |
|---|---|---|---|---|---|---|---|---|---|
| | | | | | ACTION ID | TYPE | CONTENT | DATE AND TIME | ... |
| U1 | 20S | MALE | LC11 | LC12 | AC11 | BROWSING | CONTENT CT | dt10 | ... |
| | | | | | ... | ... | ... | ... | ... |
| U2 | 30S | FEMALE | LC21 | LC22 | ... | ... | ... | ... | ... |
| ... | ... | ... | ... | ... | ... | ... | ... | ... | ... |

| USER ID | INFOR-MATION ID | TYPE | TARGET | CONTENT | DATE AND TIME | ... |
|---|---|---|---|---|---|---|
| U1 | ... | ... | ... | ... | ... | ... |
| | INF11 | LIVING BODY | HEARTBEAT | XX (bpm) | dt11 | ... |
| | INF12 | LIVING BODY | BLOOD PRESSURE | YY/ZZ (mmHg) | dt12 | ... |
| | INF13 | INPUT | SNS SERVICE SA | I FEEL GOOD BECAUSE BASEBALL TEAM BT WON... | dt13 | ... |
| | ... | ... | ... | ... | ... | ... |
| U2 | - | - | ... | - | - | - |
| U3 | - | - | ... | - | - | - |
| ... | ... | ... | ... | ... | ... | ... |
| U55 | INF51 | PUR-CHASE | SHOP SITE SH | PRODUCT A | dt51 | ... |
| | ... | ... | ... | ... | ... | ... |
| | ... | ... | ... | ... | ... | ... |

| USER ID \ USER ID | U1 | U2 | U3 | U4 | ... | Un |
|---|---|---|---|---|---|---|
| U1 | 1 | 0.5 | 0.75 | 0.1 | ... | 0.6 |
| U2 | 0.5 | 1 | 0.7 | 0.1 | ... | 0.5 |
| U3 | 0.75 | 0.7 | 1 | 0.2 | ... | 0.4 |
| U4 | 0.1 | 0.1 | 0.2 | 1 | ... | 0.1 |
| ... | ... | ... | ... | ... | ... | ... |
| Un | 0.6 | 0.5 | 0.4 | 0.1 | ... | 1 |

| CLUSTER ID | BELONGING USER | | | | ... |
| | #1 | #2 | #3 | ... | |
|---|---|---|---|---|---|
| CL1 | U1 (0.5) | U3 (0.7) | U189 (0.8) | ... | ... |
| CL2 | U3 (0.9) | U2 (0.6) | U1001 (0.5) | ... | ... |
| CL3 | U1 (0.8) | U2 (0.8) | Un (0.7) | ... | ... |
| ... | ... | ... | ... | ... | ... |
| CLk | U4 (0.85) | ... | ... | ... | ... |

| USER ID | ESTIMATED FEELING (JOY) | | ... |
| --- | --- | --- | --- |
| | SCORE | PRESENCE/ABSENCE | |
| U1 | 0.9 | PRESENCE | ... |
| U2 | 0.4 | ABSENCE | ... |
| U3 | 0.7 | PRESENCE | ... |
| U4 | 0 | ABSENCE | ... |
| ... | ... | ... | ... |
| U189 | 0.65 | PRESENCE | ... |
| ... | ... | ... | ... |
| Un | 0.2 | ABSENCE | ... |

125

ESTIMATION DEVICE, ESTIMATION METHOD, AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2017-082019 filed in Japan on Apr. 18, 2017.

BACKGROUND OF THE INVENTION

1. Field of the Invention

The present invention relates to an estimation device, an estimation method, and a non-transitory computer-readable recording medium.

2. Description of the Related Art

Conventionally, a technology that estimates various kinds of information in accordance with users has been proposed. For example, there is a proposed technology that estimates a feeling of a user from a tendency of motion data obtained based on a movement of the user that is changed in time series.

Patent Document 1: Japanese Laid-open Patent Publication No. 2015-184763

However, in the conventional technology described above, the feeling of the users is not always able to be appropriately estimated. For example, in the conventional technology described above, if the motion data on the users themselves targeted for estimation of the feeling is insufficient, it is difficult to appropriately estimate the feeling of the subject users.

SUMMARY OF THE INVENTION

It is an object of the present invention to at least partially solve the problems in the conventional technology.

According to one aspect of an embodiment, an estimation device includes an acquiring unit that acquires user relationship information indicating a similarity relationship between a plurality of users, and an estimation unit that estimates, based on feeling information on a similar user who is similar to one of the users in the user relationship information acquired by the acquiring unit, a feeling of the one of the users.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a first information storage unit according to the embodiment;

FIG. 5 is a diagram illustrating an example of a second information storage unit according to the embodiment;

FIG. 6 is a diagram illustrating an example of a user relationship information storage unit according to the embodiment;

FIG. 7 is a diagram illustrating an example of a cluster information storage unit according to the embodiment;

DETAILED DESCRIPTION OF THE PREFERRED EMBODIMENTS

Figure 1:
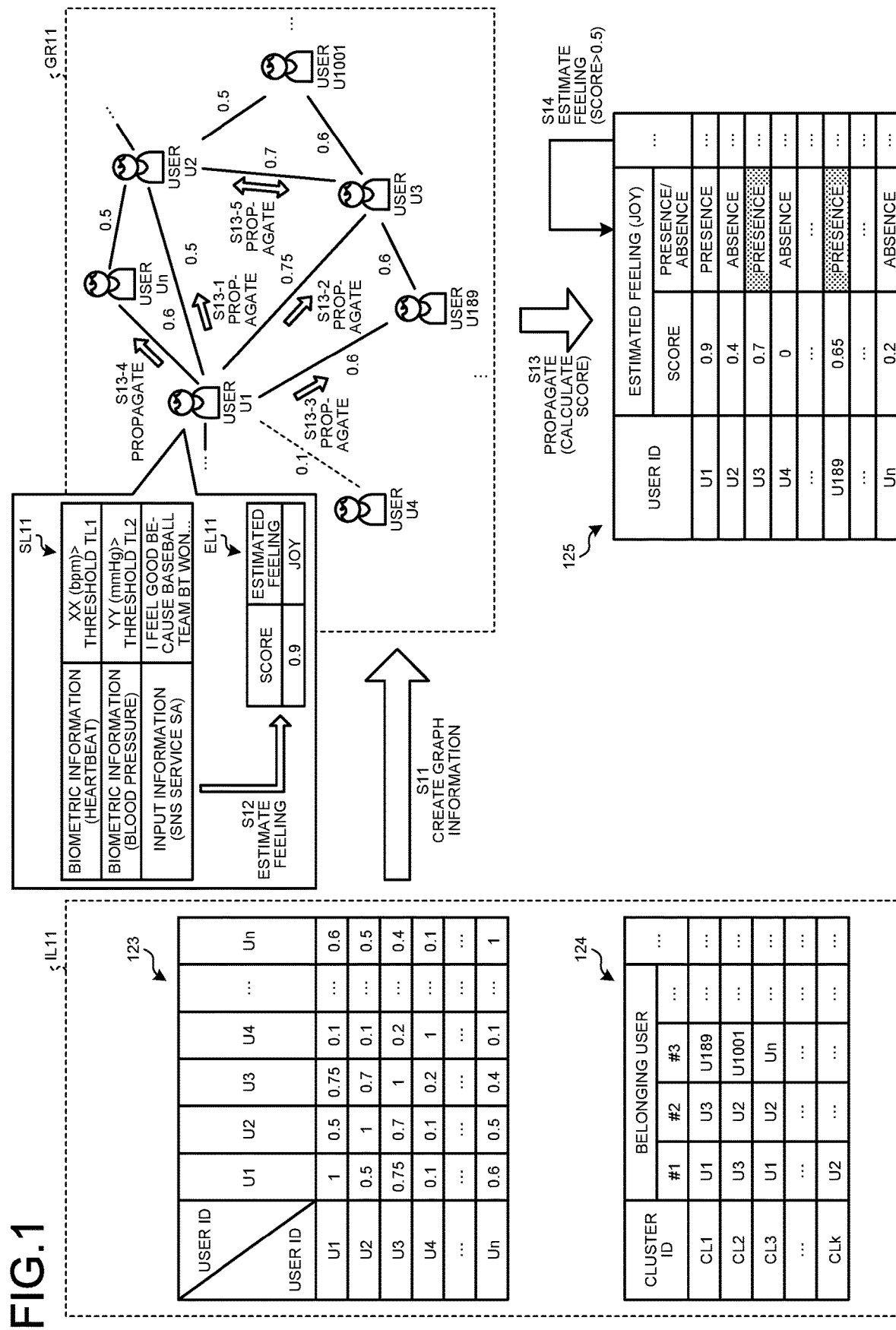
FIG. 1 is a diagram illustrating an example of an estimation process according to an embodiment.

A mode (hereinafter, referred to as an "embodiment") for carrying out an estimation device, an estimation method, and a non-transitory computer-readable storage medium having stored therein an estimation program according to the present application will be described in detail below with reference to the accompanying drawings. The estimation device, the estimation method, and the estimation program according to the present application are not limited by the embodiment. Furthermore, in the embodiments below, the same components are denoted by the same reference numerals and overlapping descriptions will be omitted.

1. Estimation Process

First, an example of an estimation process according to the embodiment will be described with reference to FIG. 1. FIG. 1 is a diagram illustrating an example of the estimation process according to an embodiment. The example illustrated in FIG. 1 indicates a case in which an estimation device 100 estimates a feeling of one of users based on feeling information on a similar user who is similar to the one of the users stored in user relationship information that indicates a similarity relationship between a plurality of users. Furthermore, the example illustrated in FIG. 1 indicates a case in which the estimation device 100 estimates a feeling of a user from which biometric information on the subject user, input information that was input (submitted) to a social networking service (SNS), or the like can be acquired and estimates a feeling of the other users based on the acquired feeling of the subject user.

Configuration of an Estimation System

Figure 2:
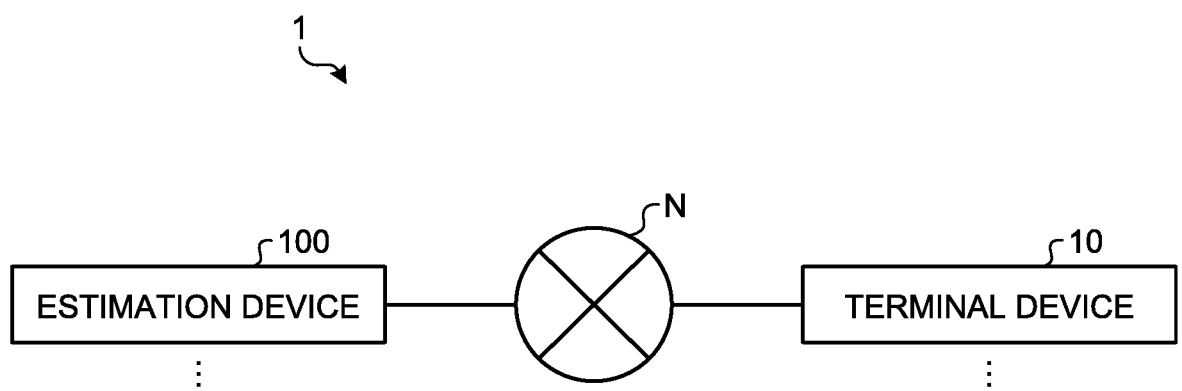
FIG. 2 is a diagram illustrating a configuration example of an estimation system according to the embodiment.

Before a description of FIG. 1, the configuration of an estimation system 1 will be described with reference to FIG. 2. FIG. 2 is a diagram illustrating a configuration example of the estimation system according to the embodiment. As illustrated in FIG. 2, the estimation system 1 includes a terminal device 10 and the estimation device 100. The terminal device 10 and the estimation device 100 are connected via a predetermined network N such that the devices can be communicated with each other in a wired or wireless manner. Furthermore, in the estimation system 1 illustrated in FIG. 2, a plurality of the terminal devices 10 or a plurality of the estimation devices 100 may also be included.

The terminal device 10 is an information processing apparatus used by a user. The terminal device 10 is implemented by, for example, a smart phone, a tablet terminal, a notebook personal computer (PC), a desktop PC, a mobile phone, a personal digital assistant (PDA), or the like. FIG. 1 indicates the case in which the terminal device 10 is a smart phone. Furthermore, it is assumed that the terminal device 10 has a function of a global positioning system (GPS) sensor or the like and can detect and acquire the location of a user. Furthermore, the terminal device 10 may also have various functions, such as a temperature sensor and an atmospheric pressure sensor, and may also be a device that can detect environmental information indicating, for example, a temperature or an atmospheric pressure of the location of the user. Furthermore, the terminal device 10 may also have various functions, such as a heartbeat sensor, and detect and acquire biometric information on the user. For example, the terminal device 10 may also be configured such that the terminal device 10 can acquire the user's own context information by allowing the user who uses the terminal device 10 to attach a wearable device that can communicate with the terminal device 10. For example, the terminal device 10 may also be configured such that the terminal device 10 can acquire information related to the user's own heartbeat (pulse) by allowing the user who uses the terminal device 10 to attach a wristband type wearable device that can communicate with the terminal device 10.

Furthermore, the terminal device 10 sends various kinds of information or the like to the estimation device 100. For example, the terminal device 10 sends action information on a user to the estimation device 100. For example, the terminal device 10 sends, to the estimation device 100, action information or the like including location information on the user or information on a search query that was used by the user for a search. In a description below, the terminal device 10 is sometimes referred to as a user. Namely, in a description below, a user can also be read as the terminal device 10. The terminal device 10 receives various operations performed by a user.

Furthermore, in a description below, in the case where a "user U* (* is an arbitrary numerical value)" is described, the subject user indicates the user identified by the user ID "U*". For example, in the case where a "user U1" is described, the subject user is the user identified by the user ID "U1".

The estimation device 100 is an information processing apparatus that estimates a feeling of one of users based on feeling information on a similar user who is similar to the one of the users stored in the user relationship information that indicates a similarity relationship between a plurality of users. In the example illustrated in FIG. 1, the estimation device 100 uses the user relationship information that is created based on information, such as attribute information on users or browsing histories of content, that can be acquired from a lot of users. Furthermore, in the example illustrated in FIG. 1, in a description below, the estimation device 100 uses the information that is used to create the user relationship information as first information and uses the information that is used to estimate a feeling of a user as second information. In the example illustrated in FIG. 1, the estimation device 100 estimates, based on the user relationship information that indicates the degree of similarity between the users, the feeling of the other users, such as a user U2, a user U3, and the like, by propagating feeling information EL11 from the user U1 from whom the feeling information EL11 has been acquired.

In the following, the flow of the estimation process will be described in more details with reference to FIG. 1. In the example illustrated in FIG. 1, it is indicated a case in which the estimation device 100 performs the estimation process on a large number of users, such as the user U1 to a user Un. Furthermore, the symbol "n" of "Un" is associated with the number of users who become the processing target and may also be, for example, "100,000", "1 million", "100 million", or the like.

For example, the estimation device 100 performs a process by using information group IL11 including a user relationship information storage unit 123, a cluster information storage unit 124, and the like. In the example illustrated in FIG. 1, the estimation device 100 uses the user relationship information that indicates the similarity relationship between the plurality of users, such as that indicated in the user relationship information storage unit 123. In the user relationship information indicated in the user relationship information storage unit 123 illustrated in FIG. 1, values each indicating the degree of similarity between the users for each combination of the users are included. In the example illustrated in FIG. 1, the estimation device 100 uses the degree of similarity between the users as a propagation coefficient of the feeling information between the users.

For example, in the user relationship information storage unit 123 illustrated in FIG. 1, in the item in which the same user IDs are intersected, i.e., in the item (grid) in which the row of the user ID "U1" intersects with the column of the user ID "U1" or the item in which the row of the user ID "U2" intersects with the column of the user ID "U2", "1" is stored. Namely, in a case of the same user, the degree of similarity becomes "1" and in the example illustrated in FIG. 1, it is indicated that the maximum value of the degree of similarity is "1".

Furthermore, for example, in the user relationship information storage unit 123 illustrated in FIG. 1, in the item (grid) in which the row of the user ID "U1" intersects with the column of the user ID "U3", the value indicating the degree of similarity between the user U1 and the user U3 is stored. In the user relationship information storage unit 123 illustrated in FIG. 1, in the item in which the row of the user ID "U1" intersects with the column of the user ID "U3", "0.75" is stored. Namely, it is indicated that the degree of similarity between the user U1 and the user U3 is "0.75" and indicated that the user U1 and the user U3 are similar.

For example, the estimation device 100 may also acquire, from an external information processing apparatus, the user relationship information such as that indicated in the user relationship information storage unit 123 illustrated in FIG. 1 or may also create the user relationship information based on various kinds of information. For example, the estimation device 100 may also create the user relationship information such as that indicated in the user relationship information storage unit 123 illustrated in FIG. 1 based on the first information on each of the users such as that indicated in a first information storage unit 121 (see FIG. 4). For example, regarding the user relationship information indicating the similarity relationship between each of the combinations of users, the estimation device 100 may also create the user relationship information by calculating the degree of similarity by appropriately using various conventional technologies, such as a technique for calculating the degree of similarity.

For example, the estimation device 100 may also create a vector of each of the users from the first information on each of the users stored in the first information storage unit 121 (see FIG. 4) and create the user relationship information based on the comparison of the vectors between each of the combinations of users. For example, the estimation device 100 may also create the vector of each of the users from the first information on each of the users stored in the first information storage unit 121 (see FIG. 4) and create the user relationship information by using the degree of cosine similarity of the vector of each of the users as the degree of similarity. Furthermore, the above description is an example and the estimation device 100 may also create the user relationship information by using any technique as long as the user relationship information indicating the similarity relationship between the users can be created.

Furthermore, in the example illustrated in FIG. 1, the estimation device 100 uses cluster information, such as that indicated in the cluster information storage unit 124, used for clustering the plurality of users. In the cluster information indicated in the cluster information storage unit 124 illustrated in FIG. 1, the information obtained by clustering each of the users performed based on the similarity of each of the users is included. In the example illustrated in FIG. 1, the estimation device 100 performs the estimation process by using the user relationship information including the cluster information such as that indicated in the cluster information storage unit 124.

The "cluster ID" indicated in the cluster information storage unit 124 illustrated in FIG. 1 indicates the identification information for identifying a cluster. The "belonging user" indicated in the cluster information storage unit 124 illustrated in FIG. 1 indicates the users who belong to the associated clusters. Furthermore, "#1", "#2", "#3", and the like indicated in the cluster information storage unit 124 illustrated in FIG. 1 indicate the users included in the associated clusters.

For example, in the cluster information storage unit 124 illustrated in FIG. 1, it is indicated that, in the cluster CL1 identified by the cluster ID "CL1", the user U1, the user U3, and a user U189 are included in the belonging user. In this way, in the case where a "cluster CL* (* is an arbitrary numerical value)" is described, this indicates that the subject cluster is the cluster identified by the cluster ID "CL*". For example, in the case where a "cluster CL11" is described, this indicates that the subject cluster is the cluster identified by the cluster ID "CL11".

Furthermore, for example, in the cluster information storage unit 124 illustrated in FIG. 1, it is indicated that, in the cluster CL2, the user U3, the user U2, and a user U1001 are included in the belonging user. Furthermore, for example, in the cluster information storage unit 124 illustrated in FIG. 1, it is indicated that, in a cluster CL3, the user U1, the user U2, and a user Un are included in the belonging user. The example illustrated in FIG. 1 indicates a case in which, as described above, the information is the cluster information created by the clustering (soft clustering) that allows each of the users to become the belonging user of a plurality of clusters. Furthermore, the above description is an example and each of the users may also be the cluster information created by the clustering (hard clustering) that allows each of the users to become the belonging user of a single cluster. Furthermore, although not illustrated in the example illustrated in FIG. 1, in the cluster information storage unit 124, as illustrated in FIG. 7, in "#1", "#2", and "#3", a numerical value (weight) indicating the degree of belonging of the user identified by the user ID with respect to a cluster is stored together with the user ID. For example, the numerical value "0.5" indicated inside the parentheses "( )" below the user ID "U1" associated with the cluster CL1 illustrated in FIG. 7 indicates that the degree of belonging of the user U1 with respect to the cluster CL1 is "0.5". Furthermore, the degree of belonging of the user with respect to the cluster may also be calculated based on various kinds of information. For example, the average value of the degree of similarities between the user U1 and the other users who belong to the cluster CL1 may also be used. For example, in the example illustrated in FIG. 1, the estimation device 100 may also use the degree of belonging of the user with respect to the cluster as a propagation coefficient of the feeling information between the users. For example, the estimation device 100 may also increase the feeling information to be propagated as the degree of belonging of the user with respect to the cluster is high. For example, the estimation device 100 may also decrease (attenuate) the feeling information to be propagated as the degree of belonging of the user with respect to the cluster is high. Furthermore, the above description is an example and, for example, the estimation device 100 may also propagate the feeling information in combination with the degree of similarity between the users and the degree of belonging with respect to the cluster. For example, the estimation device 100 may also calculate a score of the propagation destination in combination with the degree of similarity between the users and the degree of belonging with respect to the cluster. For example, the estimation device 100 may also calculate a score of the propagation destination by using a larger value between the degree of similarity between the users and the degree of belonging with respect to the cluster.

For example, the estimation device 100 may also acquire the cluster information such as that indicated in the cluster information storage unit 124 illustrated in FIG. 1 from an external information processing apparatus or may also create the cluster information based on various kinds of information. For example, the estimation device 100 may also create the user relationship information such as that indicated in the cluster information storage unit 124 illustrated in FIG. 1 based on the first information on each of the users such as that indicated in the first information storage unit 121 (see FIG. 4). Furthermore, for example, the estimation device 100 may also create the cluster information such as that indicated in the cluster information storage unit 124 illustrated in FIG. 1 based on the information, such as that indicated in the user relationship information storage unit 123, indicating the similarity relationship on each of the users. For example, the estimation device 100 may also create the cluster information based on the degree of similarity between each of the combinations of users such as that indicated in the cluster information storage unit 124 illustrated in FIG. 1. For example, the estimation device 100 may also regard, as a matrix, the information (data) indicating the similarity relationship between each of the combinations of users such as that indicated in the user relationship information storage unit 123 and may also regard, as a cluster, each of the dimensions of the vectors created by low-rank approximation, which will be described later. Furthermore, this point will be described in detail later.

For example, the estimation device 100 may also create the cluster information based on the first information that includes the attribute information on the users. For example, the estimation device 100 may also create the cluster information based on the first information that includes the attribute information on the users by using the user relationship information. Furthermore, the estimation device 100 may also create the cluster information by appropriately using various clustering techniques. The estimation device 100 may also use various kinds of clustering techniques, such as the k-means algorithm or logistic regression using a Dirichlet Process. Furthermore, the above description is an example and the estimation device 100 may also create the cluster information by using any technique as long as the estimation device 100 can create the cluster information that is used to perform clustering on the users.

First, the estimation device 100 creates graph information based on the user relationship information storage unit 123 or the cluster information storage unit 124 (Step S11). In the example illustrated in FIG. 1, the estimation device 100 creates graph information GR11 based on the user relationship information storage unit 123 or the cluster information storage unit 124 described above. The graph information GR11 illustrated in FIG. 1 indicates a part of the user U1 to the user Un. In the example illustrated in FIG. 1, to simplify a description, a description will be given with the assumption that the feeling information is propagated between the users who belongs to a common cluster. Furthermore, in a description below, each of the users who belong to a common cluster is sometimes referred to as a "similar user". Furthermore, the feeling information mentioned here may also be a predetermined value (score) associated with a predetermined feeling. For example, it is assumed that the users connected by the solid lines indicated in the graph information GR11 illustrated in FIG. 1 are the users who propagate the feeling information with each other. For example, it is assumed that the user U1 and the user U2 connected by the solid line in the graph information GR11 illustrated in FIG. 1 belong to the common cluster CL3 and are the users whose feeling information is mutually propagated. Furthermore, for example, it is assumed that the users connected by the dotted line in the graph information GR11 illustrated in FIG. 1 are the user whose feeling information is not propagated. For example, it is assumed that the user U1 and the user U4 connected by the dotted line stored in the graph information GR11 illustrated in FIG. 1 do not belong to a common cluster and are the users whose feeling information is not propagated. In a description below, the user who does not belong to a common cluster is sometimes referred to as a "dissimilar user".

Furthermore, the numerical value attached to the line connecting each of the users in the graph information GR11 illustrated in FIG. 1 indicates the degree of similarity between the users connected by the associated solid line. For example, the numerical value "0.5" attached to the solid line that connects the user U1 and the user U2 in the graph information GR11 illustrated in FIG. 1 indicates that the degree of similarity between the user U1 and the user U2 is "0.5".

Furthermore, the estimation device 100 may also perform the estimation process without creating the graph information GR11. For example, based on the user relationship information storage unit 123 and the cluster information storage unit 124, the estimation device 100 may also perform the estimation process by propagating the feeling information (score) on the user whose score has been estimated by the second information to the other users.

In the example illustrated in FIG. 1, a description will be given of a case, as an example, in which the feeling information is propagated among the users belonging to the common cluster. Furthermore, the estimation process may also be performed based on the assumption that propagation of the feeling information among the users is performed among all of the users or based on the assumption that the estimation process is performed among the users who have the degree of similarity that is equal to or greater than a predetermined threshold (for example, "0.5" or the like). Furthermore, in this case, the users who have the degree of similarity that is equal to or greater than a predetermined threshold may also be similar users. In this way, the estimation device 100 may also perform the estimation process without using, for example, the cluster information. In this case, the estimation device 100 does not need to have the cluster information storage unit 124.

Then, the estimation device 100 estimates, based on the second information on a subject user, a feeling of the subject user from whom the second information equal to or greater than the predetermined threshold has been acquired (hereinafter, also referred to as a "starting point user") (Step S12). Furthermore, the predetermined threshold may also appropriately be set in accordance with, for example, estimated accuracy obtained based on the second information. In the example illustrated in FIG. 1, as indicated in the second information group SL11, based on the second information on the user U1 indicated in the second information group SL11, the estimation device 100 estimates the feeling of the user U1 from whom the second information has been acquired. Namely, the example illustrated in FIG. 1 indicates a case in which the user U1 is a starting point user. Furthermore, a plurality of starting point users may also be present.

In the second information group SL11 illustrated in FIG. 1, biometric information on the user U1, input information that was input (submitted) by the user U1, and the like are included. For example, in the second information group SL11, regarding the biometric information (heartbeat) on the user U1, information indicating that the number of beats per minute (beats per minute) is "XX" and is increased to the point greater than a threshold TL1 is included. Furthermore, "XX" may also be a specific numerical value, such as "90". Furthermore, in the example illustrated in FIG. 1, it is indicated a case in which a value of the heartbeat at a certain point is used as the biometric information (heartbeat); however, an amount of change in heartbeat in a predetermined period may also be used.

Furthermore, for example, in the second information group SL11, regarding the biometric information (blood pressure) on the user U1, information indicating that the maximum blood pressure (systolic blood pressure) is "YY millimeter of mercury" and is increased to the point greater than a threshold TL2 is included. Furthermore, "YY" may also be a specific numerical value, such as "120". Furthermore, in the example illustrated in FIG. 1, a case in which a value of the blood pressure at a certain point is used as the biometric information (blood pressure); however, an amount of change in blood pressure in a predetermined period may also be used.

Furthermore, for example, in the second information group SL11, information that was submitted (input) to an SNS service SA by the user U1 is included. Specifically, in the second information group SL11, it is indicated that input information, such as "I feel good because a baseball team BT won . . . ", was submitted (input) to an SNS service SA by the user U1.

The estimation device 100 estimates, based on the information included in the second information group SL11 described above, the feeling of the user U1 or the score associated with the subject feeling. The score mentioned here may also be a value indicating the strength of the estimated feeling. For example, based on the input information indicating that the heartbeat or the blood pressure of the user U1 is increased to the point greater than the threshold and indicating that the feeling of the user U1, such as "I feel good because the baseball team BT won . . . ", is raised, the estimation device 100 estimates that the feeling of the user U1 is a good feeling (positive feeling). In the example illustrated in FIG. 1, based on the input information indicating that the heartbeat or the blood pressure of the user U1 is increased to the point greater than the threshold and indicating that the user U1 feels delight, such as "I feel good because the baseball team BT won . . . ", the estimation device 100 estimates the feeling of the user U1 is "joy". In a description below, the feeling of the user estimated by the estimation device 100 is sometimes referred to as an "estimated feeling".

Furthermore, estimating the feeling of a user may also appropriately be performed by using various conventional technologies. For example, the estimation device 100 may also estimate the feeling of a user by analyzing the character information submitted by the user by appropriately using various conventional technologies, such as syntactic analysis. For example, the estimation device 100 may also store a list of keywords grouped for various feelings in a storage unit 120 (see FIG. 3) and estimate, as the feeling of the user, the feeling that is the fittest keyword included, in the list, in the character information that was submitted by the user. Furthermore, for example, the estimation device 100 may also estimate the feeling of the user by using various kinds of input information, such as a query used by the user for a search, that was input by the user. Furthermore, for example, the estimation device 100 may also estimate the feeling of the user by using biometric information other than the heartbeat or the blood pressure of the user, image information on a captured image of the face of the user, or the like. Furthermore, the above description is an example and the estimation device 100 may also estimate the feeling of the user by using any technique as long as the estimation device 100 can estimate the feeling.

Furthermore, the estimation device 100 calculates the score of the user associated with the estimated feeling. For example, the estimation device 100 calculates the score of the user associated with the estimated feeling based on a difference between the heartbeat or the blood pressure and the threshold or based on the degree of change in the feeling of the user that is obtained based on the input information on the user. For example, the estimation device 100 estimates that the score is greater as the difference between the heartbeat or the blood pressure and the threshold is greater. For example, the estimation device 100 calculates that the score is greater as the degree of change in the feeling of the user obtained based on the input information on the user is greater. In the example illustrated in FIG. 1, the estimation device 100 calculates that the score of the user associated with the estimated feeling is "0.9". Furthermore, the above description is an example and the estimation device 100 may also calculate the score of the user associated with the estimated feeling in any way as long as the score is greater as the strength or the certainty factor of the estimated feeling is greater.

Then, the estimation device 100 propagates the feeling information on the user estimated at Step S12 to the other users (Step S13). For example, the estimation device 100 propagates the feeling information on the user to the other users by propagating the score of the user estimated at Step S12 to the other users.

For example, the estimation device 100 propagates the feeling information on the starting point user to another user by propagating the score of the starting point user to a similar user who is similar to the starting point user. Furthermore, the estimation device 100 further propagates the feeling information on the other users to still another user by propagating the feeling information to a similar user who is similar to the other users to whom the feeling information has been propagated from the starting point user. In this way, the estimation device 100 propagates the feeling information to each of the users by sequentially propagating, to a similar user, the feeling information starting from the starting point user.

In the example illustrated in FIG. 1, the estimation device 100 propagates the feeling information on the user U1 to the user U2 who is the similar user of the user U1 (Step S13-1). Furthermore, the estimation device 100 propagates the feeling information on the user U1 to the user U3 who is the similar user of the user U1 (Step S13-2). Furthermore, the estimation device 100 propagates the feeling information on the user U1 to the user U189 who is the similar user of the user U1 (Step S13-3). Furthermore, the estimation device 100 propagates the feeling information on the user U1 to the user Un who is the similar user of the user U1 (Step S13-4). Furthermore, in the example illustrated in FIG. 1, because the user U4 is a dissimilar user of the user U1, the feeling information on the user U1 is not propagated.

In the example illustrated in FIG. 1, the estimation device 100 propagates the feeling information on the user U2 to the user U3 who is the similar user of the user U2 (Step S13-5). Furthermore, the estimation device 100 propagates the feeling information on the user U3 to the user U2 who is the similar user of the user U3 (Step S13-5). In this way, the estimation device 100 may also mutually propagate the feeling information on each of the users. For example, the estimation device 100 propagates the feeling information on the user U2 to the user U1, the user U1001, and the user Un who are the similar users of the user U2. Furthermore, for example, the estimation device 100 propagates the feeling information on the user U3 to the user U1, the user U189, and the user U1001 who are the similar users of the user U3.

Furthermore, the above description is an example and the estimation device 100 may also propagate the feeling information by appropriately using various conventional technologies, such as a label propagation algorithm. Namely, the estimation device 100 may also propagate the feeling information by using any technique as long as the feeling information sent from the starting point user can be propagated. For example, the estimation device 100 may also calculate the score by using any technique as long as the score of each of the users can be calculated based on the score of each of the users and the degree of similarity between the users.

In the example illustrated in FIG. 1, the estimation device 100 propagates the feeling information on the user U1 to the other users by calculating the score of the other users based on the score of the user U1 estimated at Step S12 and based on the degree of similarity between the user U1 and the other users. Specifically, the estimation device 100 calculates the score of each of the users associated with the estimated feeling "joy" indicated in a feeling information storage unit 125. For example, based on the value obtained by multiplying the score of the user who becomes the propagation source of the feeling information by the degree of similarity between the users, the estimation device 100 may also calculate the score of the other user who becomes the propagation destination.

For example, the estimation device 100 calculates the score of the propagation destination such that a decrease (attenuation) from the score of the propagation source becomes smaller as the degree of similarity between the users used for a propagation coefficient is greater. For example, the estimation device 100 calculates the score of the propagation destination such that, at the time of transfer of the feeling information between the users having the degree of similarity of "1" that is used as the propagation coefficient, the score of the propagation source is not decreased. For example, at the time of transfer of the feeling information between the users having the degree of similarity of "1" that is used as the propagation coefficient, the estimation device 100 may also calculate the score of the propagation source as the score of the propagation destination. For example, at the time of transfer of the feeling information between the users having the degree of similarity of "0.9", the estimation device 100 may also calculate the score of the propagation destination so as to be decreased by 90% from the score of the propagation source. For example, the estimation device 100 calculates the score of the propagation destination such that a decrease (attenuation) from the score of the propagation source becomes greater as the degree of similarity between the users used for the propagation coefficient is smaller. Furthermore, for example, the estimation device 100 may also calculate the score of the propagation destination, in which the feeling information is propagated from a plurality of propagation sources, by using the average of the feeling information obtained from the plurality of propagation sources or may also calculate the score of the propagation destination based on the most influential feeling information (the maximum score) from among the pieces of feeling information obtained from the plurality of propagation sources.

Furthermore, for example, the estimation device 100 may also calculate a third score calculated based on a first score that has been calculated based on the value obtained by multiplying the score of the user who becomes the propagation source of the feeling information by the degree of similarity between the users and based on a second score that is based on the second information on the other user who becomes the propagation destination. For example, the estimation device 100 may also calculate the third score by summing the value, which is obtained by multiplying the first score by the predetermined parameter, and the second score. In this case, the estimation device 100 may also use the third score as the score of the other user who becomes the propagation destination.

The "user ID" indicated in the feeling information storage unit 125 illustrated in FIG. 1 indicates identification information for identifying a user. The "estimated feeling (joy)" indicated in the feeling information storage unit 125 illustrated in FIG. 1 indicates that the estimated feeling is joy. The "score" indicated in the feeling information storage unit 125 illustrated in FIG. 1 indicates the score related to the associated estimated feeling. The "presence/absence" indicated in the feeling information storage unit 125 illustrated in FIG. 1 indicates the presence or absence of the estimated feeling of the associated user.

For example, in the feeling information storage unit 125 illustrated in FIG. 1, it is indicated that the score of the user U1 is calculated as "0.9". For example, in the feeling information storage unit 125 illustrated in FIG. 1, it is indicated that the score of the user U2 is calculated as "0.4". Furthermore, for example, in the feeling information storage unit 125 illustrated in FIG. 1, it is indicated that the score of the user U3 is calculated as "0.7". Furthermore, for example, in the feeling information storage unit 125 illustrated in FIG. 1, it is indicated that the score of the user U4 is calculated as "0". Furthermore, for example, in the feeling information storage unit 125 illustrated in FIG. 1, it is indicated that the score of the user U189 is calculated as "0.65". Furthermore, for example, in the feeling information storage unit 125 illustrated in FIG. 1, it is indicated that the score of the user Un is calculated as "0.2".

Then, the estimation device 100 estimates the feeling of each of the users (Step S14). For example, the estimation device 100 estimates, based on the score associated with the estimated feeling of each of the users, whether each of the users has the estimated feeling. In the example illustrated in FIG. 1, the estimation device 100 estimates, based on the score of each of the users associated with the estimated feeling (joy) stored in the feeling information storage unit 125, whether the feeling of each of the users is "joy". Specifically, if the score of the user associated with the estimated feeling (joy) is greater than the threshold "0.5", the estimation device 100 estimates that the feeling of the subject user is "joy". Furthermore, if the score of the associated with the estimated feeling (joy) is equal to or less than the threshold "0.5", the estimation device 100 estimates that the feeling of the subject user is not "joy".

In the example illustrated in FIG. 1, because the score of the user U3 is "0.7", the estimation device 100 estimates that, regarding the user U3, the presence or absence of the estimated feeling (joy) is "presence". Namely, the estimation device 100 estimates that the feeling of joy is generated in the user U3. Furthermore, in the example illustrated in FIG. 1, because the score of the user U189 is "0.65", the estimation device 100 estimates that, regarding the user U189, the presence or absence of the estimated feeling (joy) is "presence". Namely, the estimation device 100 estimates that the feeling of joy is generated in the user U189. In this way, the estimation device 100 can estimate the feeling of the other users other than the user U1 by propagating the feeling information on the user U1 who is the starting point user.

Furthermore, in the example illustrated in FIG. 1, because the score of the user U2 is "0.4", the estimation device 100 estimates that, regarding the user U2, the presence or absence of the estimated feeling (joy) is "absence". Namely, the estimation device 100 estimates that the feeling of joy is not generated in the user U2. Furthermore, in the example illustrated in FIG. 1, because the score of the user U4 is "0", the estimation device 100 estimates that, regarding the user U4, the presence or absence of the estimated feeling (joy) is "absence". Namely, the estimation device 100 estimates that the feeling of joy is not generated in the user U4.

Furthermore, in the example illustrated in FIG. 1, because the score of the user Un is "0.2", the estimation device 100 estimates that, regarding the user U2, the presence or absence of the estimated feeling (joy) is "absence". Namely, the estimation device 100 estimates that the feeling of joy is not generated in the user U2. Furthermore, in the example illustrated in FIG. 1, because the score of the user U1 is "0.9", the estimation device 100 estimates that, regarding the user U1, the presence or absence of the estimated feeling (joy) is "presence". Namely, the estimation device 100 estimates that the feeling of joy is generated in the user U1.

As described above, by propagating the feeling information by using the user relationship information, the estimation device 100 can estimate, based on the feeling information on the user U1 who is the starting point user, the feeling of the user U3 and the user U189 who are the similar users of the user U1. In this way, the estimation device 100 can appropriately estimate the feeling of the user by estimating the feeling of one of the users based on the feeling information on a similar user who is similar to the one of the users in the user relationship information that indicates a similarity relationship between a plurality of users.

Here, the feeling of a user is susceptible to the circumstances of the surroundings (community or the like) of the user compared with the interest or the attention of the user. In other words, the feeling of the user is easily changed due to the influence of the circumstances of the surroundings (community or the like) of the user compared with the interest or the attention of the user. Furthermore, the period of a change in the feeling of the user is short compared with the interest or the attention of the user and, if the feeling of the user is not expressed (output) to outside by the user by itself and remains inside the user (user's inner thoughts), it is difficult to estimate the feeling. However, because the estimation device 100 estimates the feeling of one of the users based on the feeling information on the similar user who is similar to the one of the users in the user relationship information that indicates the similarity relationship between the plurality of combinations of the users, the estimation device 100 can appropriately estimate the feeling of the one of the users by using, even if the one of the users does not output the user's feeling outside, the feeling information on the other users who have output the feeling outside. For example, the estimation system 1 may also provide various services to the users based on the feeling of the users estimated by the estimation device 100. For example, the estimation system 1 may also use, for user targeting, the information related to the feeling of the users estimated by the estimation device 100. For example, the estimation system 1 may also distribute the content of an advertisement or the like to the users based on the feeling of the users estimated by the estimation device 100.

1-1. Estimated Feeling

Furthermore, in the example described above, a case in which the target of the estimated feeling is regarded as "joy" and the estimation device 100 estimates whether the feeling of the user is "joy" has been described; however, the estimation device 100 may also estimate various feelings. For example, the estimation device 100 may also estimate various feelings, such as anger, sadness, pleasure, absence, and apathy. For example, the estimation device 100 may also estimate anger, sadness, or the like as a passive feeling. Furthermore, for example, the estimation device 100 may also estimate joy, pleasure, or the like as a positive feeling. Furthermore, for example, the estimation device 100 may also estimate the state in which no movement is present in user's mind as an emotionless state.

2. Configuration of the Estimation Device

Figure 3:
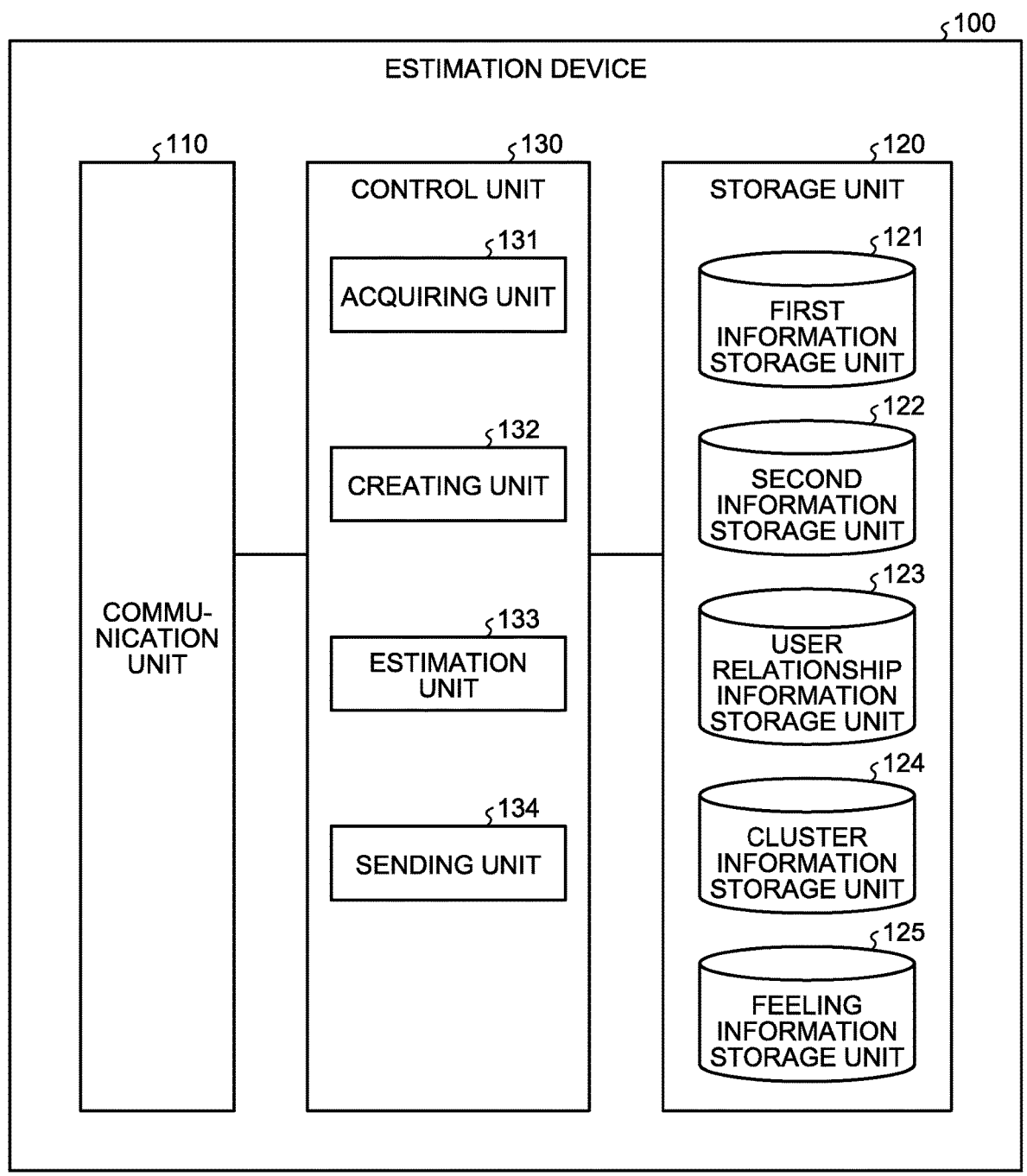
FIG. 3 is a diagram illustrating a configuration example of an estimation device according to the embodiment.

In the following, the configuration of the estimation device 100 according to the embodiment will be described with reference to FIG. 3. FIG. 3 is a diagram illustrating a configuration example of the estimation device according to the embodiment. As illustrated in FIG. 3, the estimation device 100 includes a communication unit 110, the storage unit 120, and a control unit 130. Furthermore, the estimation device 100 may also include an input unit (for example, a keyboard, a mouse, or the like) that receives various operations from an administrator or the like of the estimation device 100 or may also include a displaying unit (for example, a liquid crystal display or the like) that is used to display various kinds of information.

Communication Unit 110

The communication unit 110 is implemented by, for example, a network interface card (NIC), or the like. Furthermore, the communication unit 110 is connected to a network N in a wired or wireless manner and sends and receives information to and from the terminal device 10.

Storage unit 120

The storage unit 120 is implemented by, for example, a semiconductor memory device, such as a random access memory (RAM) or a flash memory, or a storage device, such as a hard disk or an optical disk. The storage unit 120 according to the embodiment includes, as illustrated in FIG. 3, the first information storage unit 121, a second information storage unit 122, the user relationship information storage unit 123, the cluster information storage unit 124, and the feeling information storage unit 125.

First Information Storage Unit 121

The first information storage unit 121 according to the embodiment stores therein the first information. For example, the first information storage unit 121 stores therein various kinds of information related to the user attribute or the action information associated with the first information. FIG. 4 is a diagram illustrating an example of the first information storage unit according to the embodiment. The first information storage unit 121 illustrated in FIG. 4 has items, such as "user ID", "age", "gender", "home", "work location", "action information", and the like. The "action information" has items, such as "action ID", "type", "content", "date and time", and the like.

The "user ID" indicates the identification information for identifying a user. The "age" indicates the age of the user. Furthermore, the "age" may also be a specific age, for example, 35 years old, of the user identified by the user ID. The "gender" indicates the gender of the user.

The "home" indicates location information on the home of the user. Furthermore, in the example illustrated in FIG. 4, the "home" is indicated by an abstract symbol, such as "LC11"; however, the "home" may also be information indicating latitude and longitude. Furthermore, for example, the "home" may also be a region name or an address.

The "work location" indicates location information on a work location of the user. Furthermore, in the example illustrated in FIG. 4, the "work location" is indicated by an abstract symbol, such as "LC12"; however, the "work location" may also be information indicating latitude and longitude. Furthermore, for example, the "work location" may also be a region name or an address.

In the "action information", the action information on the user associated with the first information is stored. The "action ID" indicates information for identifying the action of the user. The "type" indicates information related to the type of action of the associated user. The "content" indicates content targeted at the time of action of the associated user. The "date and time" indicates the date and time at which the action of the associated user was taken. The "date and time" is indicated by an abstract symbol, such as "dt10"; however, a specific date and time, such as "22:30:52 on Apr. 12, 2017", may also be indicated. Furthermore, in the "action information", the item of "location" that stores therein location information indicating the location of the user may also be included.

For example, in the example illustrated in FIG. 4, it is indicated that the age of the user (user U1) identified by the user ID "U1" is "20s" and the gender is "male". Furthermore, it is indicated that the home of the user U1 is "LC11". Furthermore, it is indicated that the work location of the user U1 is "LC12".

For example, in the example illustrated in FIG. 4, it is indicated that the user U1 has taken the action (action AC11) identified by the action ID "AC11" or the like. Specifically, it is indicated that the user U1 browsed content CT at the date and time dt10.

Furthermore, the first information storage unit 121 is not limited to the unit described above and may also store therein various kinds of information in accordance with purposes. For example, the first information storage unit 121 may also store therein various kinds of information, such as the demographic attribute information or the psychographic attribute information. For example, the first information storage unit 121 may also store therein information on a name, a family structure, an income, interest, or the like.

Second Information Storage Unit 122

The second information storage unit 122 according to the embodiment stores therein the second information. FIG. 5 is a diagram illustrating an example of the second information storage unit according to the embodiment. For example, the second information storage unit 122 stores therein, as the action information, information related to an environment, in which the user is placed, of the location of the user at a certain time point (time). For example, the second information storage unit 122 stores therein, as the action information, weather information at the location of the user at a certain time point (time). The second information storage unit 122 illustrated in FIG. 5 stores therein the item, such as "user ID", "information ID", "type", "target", "content", "date and time", "location", and the like.

The "user ID" indicates identification information for identifying a user. For example, the user identified by the user ID "U1" is associated with the user U1 indicated in the example illustrated in FIG. 1. The "information ID" indicates information for identifying the action of the user. The "type" indicates information related to the type of the second information. The "target" indicates the acquisition target of the associated second information.

The "content" indicates specific content of the second information. The "date and time" indicates the date and time at which the associated second information was acquired. The "date and time" is indicated by an abstract symbol, such as "dt11"; however, a specific date and time, such as "23:11:42 on Apr. 12, 2017", may also be indicated.

For example, in the example illustrated in FIG. 5, it is indicated that the user (user U1) identified by the user ID "U1" has acquired the second information identified by information ID "INF11", information ID "INF12", information ID "INF13", and the like.

Specifically, it is indicated that the user U1 acquired the second information (the second information INF11) identified by the information ID "INF11" on the date and time of dt11. The second information INF11 indicates that the type is "living body" and the target is "heartbeat". Namely, it is indicated that the second information INF11 acquired on the date and time dt11 is the biometric information related to the heartbeat. Furthermore, the second information INF11 indicates that the number of beats per minute (beats per minute) is "XX". Furthermore, "XX" may also be a specific numerical value, such as "100".

Furthermore, it is indicated that the user U1 acquired the second information (the second information INF12) identified by the information ID "INF12" on the date and time dt12. The second information INF12 indicates that the type is "living body" and the target is "blood pressure". Namely, it is indicated that the second information INF12 acquired on the date and time dt12 is the biometric information related to the blood pressure. Furthermore, the second information INF12 indicates that the maximum blood pressure (systolic blood pressure) of the user U1 is "YY millimeter of mercury" and indicates that the minimum blood pressure (diastolic blood pressure) is "ZZ millimeter of mercury". Furthermore, "YY" or "ZZ" may also be specific numerical values, such as "110", "80", respectively.

Furthermore, it is indicated that the user U1 acquired the second information (the second information INF13) identified by the information ID "INF13" on the date and time dt13. The second information INF13 indicates that the type is "input" and the target is "SNS service SA". Namely, it is indicated that the second information INF13 acquired on the date and time dt13 is the information that is submitted (input) to the SNS service SA by the user U1. Furthermore, the second information INF13 indicates that the information submitted (input) to the SNS service SA by the user U1 was the content, such as "I feel good because a baseball team BT won . . . ".

Furthermore, the second information storage unit 122 is not limited to the unit described above and may also store therein various kinds of information in accordance with purposes. Furthermore, in FIG. 5, a case in which the action information is stored in the second information storage unit 122 for each user ID has been described; however, the action information is not limited to each user ID but may also be stored in the order of, for example, time.

User Relationship Information Storage Unit 123

The user relationship information storage unit 123 according to the embodiment stores therein various kinds of information indicating the relationship between the users. FIG. 6 is a diagram illustrating an example of the user relationship information storage unit according to the embodiment. As illustrated in FIG. 6, as user relationship information, the user relationship information storage unit 123 stores therein the degree of similarity between the users each identified by the user ID.

For example, in the example illustrated in FIG. 6, in the item in which the same user IDs are intersected, such as the item (grid) in which the row of the user ID "U1" intersects with the column of the user ID "U1" or the item in which the row of the user ID "U2" intersects with the column of the user ID "U2", "1" is stored. Namely, in a case of the same user, the degree of similarity becomes "1" and, in the example illustrated in FIG. 6, it is indicated that the maximum value of the degree of similarity is "1".

Furthermore, for example, in the example illustrated in FIG. 6, in the item (grid) in which the row of the user ID "U1" intersects with the column of the user ID "U3", the value indicating the degree of similarity between the user U1 and the user U3 is stored. In the example illustrated in FIG. 6, "0.75" is stored in the item in which the row of the user ID "U1" intersects with the column of the user ID "U3". Namely, it is indicated that the degree of similarity between the user U1 and the user U3 is "0.75" and it is indicated that both the user U1 and the user U3 are similar.

Furthermore, in the example illustrated in FIG. 6, in the item in which the row of the user ID "U2" intersects with the column of the user ID "U1", the same information as that on the item in which the row of the user ID "U1" intersects with the column of the user ID "U2" is stored. Furthermore, the estimation device 100 may also store only one of the items between the item in which the row of the user ID "U1" intersects with the column of the user ID "U2" and the item in which the row of the user ID "U2" intersects with the column of the user ID "U1".

Furthermore, in the example illustrated in FIG. 6, in the item in which the row of the user ID "U1" intersects with the column of the user ID "U4", "0.1" is stored. Namely, it is indicated that the degree of similarity between the user U1 and the user U4 is "0.1" and it is indicated that both the user U1 and the user U4 are not similar.

Cluster Information Storage Unit 124

The cluster information storage unit 124 according to the embodiment stores therein various kinds of information related to clusters. FIG. 7 is a diagram illustrating an example of the cluster information storage unit according to the embodiment. The cluster information storage unit 124 illustrated in FIG. 7 has items, such as "cluster ID", "belonging user", and the like. In the "belonging user", items, such as "#1", "#2", "#3", and the like, are included.

The "cluster ID" indicates identification information for identifying a cluster. The "belonging user" indicates a user belonging to the associated cluster. Furthermore, the item is not limited to "#1", "#2", and "#3" and, in the "belonging user", the item, such as "#4" is included. For example, if the number of belonging users belonging to the associated cluster is five, in the "belonging user", the items, such as "#1", "#2", "#3", "#4", and "#5", are included.

For example, in the example illustrated in FIG. 7, in the cluster (cluster CL1) identified by the cluster ID "CL1", it is indicated that the user identified by the user ID "U1", the user identified by the user ID "U3", and the user identified by the user ID "U189" are included in the belonging user. Furthermore, in FIG. 7, the numerical values stored in "#1", "#2", "#3" together with the user ID indicate the degree of belonging of each of the users identified by the user IDs with respect to the clusters. For example, in FIG. 7, the numerical value indicated inside the parentheses "( )" below the user ID (U1 or the like) indicates the degree of belonging of the user identified by the user ID with respect to the cluster. For example, in the example illustrated in FIG. 7, the numerical value "0.5" indicated inside the parentheses "( )" below the user ID "U1" associated with the cluster CL1 indicates that the degree of belonging of the user U1 with respect to the cluster CL1 is "0.5". Furthermore, the degree of belonging of a user with respect to a cluster may also be calculated based on various kinds of information. For example, the average value of the degree of similarities between the user U1 and the other users who belong to the cluster CL1 may also be used.

Furthermore, the cluster information storage unit 124 is not limited to the unit described above and may also store therein various kinds of information in accordance with purposes. For example, the cluster information storage unit 124 may also store therein information (label) that indicates the meaning of each of the clusters by associating the information with each of the clusters. For example, the cluster information storage unit 124 may also store therein a label of a "fan of the baseball team BT" in association with the cluster identified by the cluster ID "CL1".

Feeling Information Storage Unit 125

Figures 8, 9:
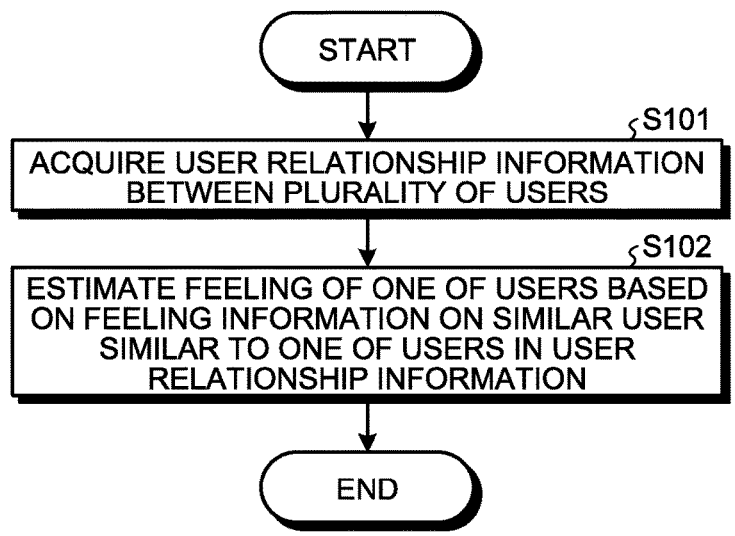
FIG. 8 is a diagram illustrating an example of a feeling information storage unit according to the embodiment.
FIG. 9 is a flowchart illustrating an example of the estimation process according to the embodiment.

The feeling information storage unit 125 according to the embodiment stores therein various kinds of information related to feelings. For example, the feeling information storage unit 125 stores therein feeling information related to an estimated feeling of a user. FIG. 8 is a diagram illustrating an example of the feeling information storage unit according to the embodiment. The feeling information storage unit 125 illustrated in FIG. 8 has items, such as "user ID", "estimated feeling (joy)", and the like. Furthermore, the "estimated feeling (joy)" has items, such as "score" and "presence/absence".

The "user ID" indicates the identification information for identifying a user. The "estimated feeling (joy)" indicates that an estimated feeling is joy. The "score" indicates the score related to the associated estimated feeling. For example, the "score" may also be a value indicating the degree of possibility that a user has the subject feeling. The "presence/absence" indicates the presence or absence of the estimated feeling held in the associated user. For example, the "presence/absence" may also be the information that indicates, based on the associated score, whether the estimated feeling is generated in the user. For example, the "presence/absence" may also be information indicating that estimated feeling is generated in the users with the associated score of a value equal to or greater than a predetermined threshold.

For example, in the example illustrated in FIG. 8, regarding the user identified by the user ID "U1", it is indicated that the score is "0.9" and the presence or absence of the estimated feeling (joy) is "presence". Namely, it is indicated that the user U1 is the user who has a feeling of joy. Furthermore, for example, in the example illustrated in FIG. 8, regarding the user identified by the user ID "U2", it is indicated that the score is "0.4" and the presence or absence of the estimated feeling (joy) is "absence". Namely, it is indicated that the user U2 is the user who does not have a feeling of joy. Furthermore, for example, in the example illustrated in FIG. 8, regarding the user identified by the user ID "U3", it is indicated that the score is "0.7" and the presence or absence of the estimated feeling (joy) is "presence". Namely, it is indicated that the user U3 is the user who has a feeling of joy. Furthermore, in the example illustrated in FIG. 8, a case in which the estimated feeling is "joy" is indicated; however, the estimated feeling may also be a feeling other than "joy", such as "anger" or "sadness". For example, in the feeling information storage unit 125, items, such as an "estimated feeling (anger)" and an "estimated feeling (sadness)", may also be included.

Furthermore, the feeling information storage unit 125 is not limited to the unit described above and may also store therein various kinds of information in accordance with purposes. For example, the feeling information storage unit 125 may also store information (label) indicating the meaning of each of the users by associating the information with each of the users. For example, the feeling information storage unit 125 may also store therein a label of a "fan of the baseball team BT" in association with the user identified by the user ID "U1".

Control Unit 130

A description will be given here by referring back to FIG. 3. The control unit 130 is a controller and is implemented by, for example, a central processing unit (CPU), a micro processing unit (MPU), or the like, executing various kinds of programs (corresponding to an example of an estimation program), which are stored in a storage device in the estimation device 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 3, the control unit 130 includes an acquiring unit 131, a creating unit 132, an estimation unit 133, and a sending unit 134 and implements or executes the function or the operation of the information processing described below. Furthermore, the internal configuration of the control unit 130 is not limited to the configuration illustrated in FIG. 3 and another configuration may also be used as long as the configuration in which the information processing described below is performed. Furthermore, a connection relation of each of the processing units included in the control unit 130 is not limited to the connection relation illustrated in FIG. 3 and another connection relation may also be used.

Acquiring Unit 131

The acquiring unit 131 acquires various kinds of information. The acquiring unit 131 acquires various kinds of information from an external device, such as the terminal device 10. Furthermore, the acquiring unit 131 acquires various kinds of information from the first information storage unit 121, the second information storage unit 122, the user relationship information storage unit 123, the cluster information storage unit 124, the feeling information storage unit 125, and the like.

For example, the acquiring unit 131 acquires user relationship information indicating the similarity relationship between a plurality of users. For example, the acquiring unit 131 acquires user relationship information created based on the first information that is related to each of the plurality of users.

For example, the acquiring unit 131 acquires the user relationship information created based on the first information that includes the action information on the users and that is other than the second information. For example, the acquiring unit 131 acquires the user relationship information created based on the first information that includes the attribute information on the user.

In the example illustrated in FIG. 1, the acquiring unit 131 acquires various kinds of information from the user relationship information storage unit 123, the cluster information storage unit 124, and the like.

Creating Unit 132

The creating unit 132 creates various kinds of information. For example, the creating unit 132 creates various kinds of information based on the first information storage unit 121, the second information storage unit 122, the user relationship information storage unit 123, the cluster information storage unit 124, and the like. For example, the creating unit 132 creates various kinds of information based on the information acquired by the acquiring unit 131.

For example, the creating unit 132 may also create the user relationship information, the cluster information, and the like. For example, the creating unit 132 may also create the user relationship information based on first information that includes the action information on the users and that is other than the second information. For example, the creating unit 132 may also create the user relationship information based on the first information that includes the attribute information on the users. For example, the creating unit 132 may also create the cluster information based on the first information that includes the action information on the users other than the second information.

For example, the creating unit 132 may also create the cluster information based on the first information that includes the attribute information on the users. For example, the creating unit 132 may also create, by using the user relationship information, the cluster information based on the first information that includes the attribute information on the users.

Furthermore, the creating unit 132 may also create the cluster information by appropriately using various clustering techniques. The creating unit 132 may also use various clustering techniques, such as the k-means algorithm or logistic regression using a Dirichlet process.

In the example illustrated in FIG. 1, the creating unit 132 creates the graph information GR11 based on the user relationship information storage unit 123, the cluster information storage unit 124, and the like.

Estimating Unit 133

The estimation unit 133 estimates various kinds of information. For example, the estimation unit 133 estimates various kinds of information based on the information acquired by the acquiring unit 131. For example, the estimation unit 133 estimates various kinds of information based on the information acquired from the terminal device 10. For example, the estimation unit 133 estimates various kinds of information based on the various kinds of information stored in the first information storage unit 121, the second information storage unit 122, the user relationship information storage unit 123, the cluster information storage unit 124, and the like. For example, the estimation unit 133 estimates a feeling of a user based on the graph information GR11 created by the creating unit 132. For example, the estimation unit 133 stores the estimated feeling information of the user in the feeling information storage unit 125.

For example, the estimation unit 133 estimates a feeling of one of the users based on the feeling information on a similar user similar to the one of the user stored in the user relationship information that is acquired by the acquiring unit 131. For example, the estimation unit 133 estimates the feeling of one of the users based on the feeling information on the one of the users. For example, the estimation unit 133 estimates the feeling of the one of the users based on the user relationship information including the information related to the degree of similarity that indicates the similarity between the users and based on the feeling information on the similar user who has the degree of similarity between the one of the users equal to or greater than a predetermined threshold. For example, the estimation unit 133 estimates the feeling of the one of the users by propagating the feeling information from the similar user whose feeling has been estimated based on the feeling information to the user who is similar to the similar user.

For example, the estimation unit 133 estimates the feeling of the one of the users based on the user relationship information that includes the cluster information obtained by clustering the users and based on the feeling information on the similar user who belongs to a common cluster to which the one of the users belongs. For example, the estimation unit 133 estimates the feeling of the one of the users based on the user relationship information that includes the cluster information obtained by clustering the user and based on the feeling information allocated to the cluster to which the one of the user belongs. For example, the estimation unit 133 estimates the feeling of the one of the users by performing a process of propagating the feeling information from the similar user whose feeling has been estimated based on the feeling information to the cluster to which the similar user belongs and by performing a process of propagating the feeling information on the subject cluster from the subject cluster to the user who belongs to the subject cluster.

For example, the estimation unit 133 estimates the feeling of the one of the users based on the feeling information on the similar user estimated based on the second information that is related to the similar user and that has a type different from that of the first information. For example, the estimation unit 133 estimates the feeling of the one of the users based on the feeling information on the similar user that was estimated based on the second information in which the connection with the feeling is higher than that of the first information. For example, the estimation unit 133 estimates the feeling of the one of the users based on the feeling information on the similar user estimated based on the second information that includes the biometric information on the user. For example, the estimation unit 133 estimates the feeling of the one of the users based on the feeling information on the similar user estimated based on the second information that includes the image information on a captured image of the user.

For example, the estimation unit 133 estimates the feeling of the one of the users based on the feeling information on the similar user estimated based on the second information that includes the action information on the user associated with the action of a predetermined type. For example, the estimation unit 133 estimates the feeling of the one of the users based on the feeling information on the similar user estimated based on the second information that includes, as the action information on the user, at least one piece of input information that was input by the user in a service provided via the network and purchase information indicating a purchase performed by the user.

For example, the estimation unit 133 estimates the feeling of the one of the users based on a plurality of matrices obtained by performing low-rank approximation on a matrix that indicates the degree of similarity between the users created based on the user relationship information. For example, between a first matrix and a second matrix obtained by performing low-rank approximation on the matrix that indicates the degree of similarity between the users created based on the user relationship information, the estimation unit 133 estimates the feeling of the one of the users by using the first matrix. Furthermore, this point will be described in detail later.

In the example illustrated in FIG. 1, the estimation unit 133 estimates the feeling of the user from whom the second information equal to or greater than the predetermined threshold has been acquired (hereinafter, also referred to as a "starting point user") based on the second information on the subject user. For example, as indicated by the second information group SL11, the estimation unit 133 estimates, based on the second information on the user U1 indicated in the second information group SL11, the feeling of the user U1 from whom the second information has been acquired.

In the example illustrated in FIG. 1, based on the information included in the second information group SL11, the estimation unit 133 estimates the feeling of the user U1 and the score associated with the subject feeling. For example, based on the input information indicating that the heartbeat or the blood pressure of the user U1 is increased to the point greater than the threshold and indicating that the feeling of the user U1 is raised, such as "I feel good because the baseball team BT won . . . ", the estimation device 100 estimates that the feeling of the user U1 is a good feeling (positive feeling). For example, based on the input information indicating that the heartbeat or the blood pressure of the user U1 is increased to the point greater than the threshold and indicating that the user U1 feels delight, such as "I feel good because the baseball team BT won . . . ", the estimation unit 133 estimates the feeling of the user U1 is "joy". For example, the estimation unit 133 estimates the score is greater as a difference between the heartbeat or the blood pressure and the threshold is greater.

In the example illustrated in FIG. 1, the estimation unit 133 calculates the score of the user associated with the estimated feeling. For example, the estimation device 100 calculates the score of the user associated with the estimated feeling based on the difference between the heartbeat or the blood pressure and the threshold or based on the degree in change in the feeling of the user that is obtained based on the input information on the user. For example, the estimation unit 133 estimates that the score is greater as the difference between the heartbeat or the blood pressure and the threshold is greater. For example, the estimation unit 133 calculates that the score is greater as the degree of change in the feeling of the user obtained based on the input information on the user is greater. For example, the estimation unit 133 calculates that the score of the user associated with the estimated feeling is "0.9".

In the example illustrated in FIG. 1, the estimation unit 133 estimates the feeling of the user. For example, the estimation device 100 estimates, based on the score associated with the estimated feeling of each of the users, whether each of the users has the estimated feeling. For example, based on the score of each of the users associated with the estimated feeling (joy) stored in the feeling information storage unit 125, the estimation device 100 estimates whether the feeling of each of the user is "joy". For example, if the score of the user associated with the estimated feeling (joy) is greater than the threshold "0.5", the estimation device 100 estimates that the feeling of the subject user is "joy". For example, if the score of the user associated with the estimated feeling (joy) is equal to or less than the threshold "0.5", the estimation device 100 estimates that the feeling of the subject user is not "joy".

In the example illustrated in FIG. 1, because the score of the user U3 is "0.7", the estimation unit 133 estimates that, regarding the user U3, the presence or absence of the estimated feeling (joy) is "presence". Namely, the estimation unit 133 estimates that the feeling of joy is generated in the user U3. Furthermore, in the example illustrated in FIG. 1, because the score of the user U189 is "0.65", the estimation unit 133 estimates that, regarding the user U189, the presence or absence of the estimated feeling (joy) is "presence". Namely, the estimation unit 133 estimates that the feeling of joy is generated in the user U189.

Sending Unit 134

The sending unit 134 sends various kinds of information to an external device, such as the terminal device 10. For example, the sending unit 134 may also provide various kinds of information estimated by the estimation unit 133 to an external device. Furthermore, the sending unit 134 may also provide various kinds of information estimated by the estimation unit 133 to an external device. Furthermore, the sending unit 134 may also provide various kinds of information created by the creating unit 132 to an external device. For example, the sending unit 134 sends the information related to the feeling of the user estimated by the estimation unit 133 to an external device. For example, the sending unit 134 provides the estimated feeling of each of the users stored in the feeling information storage unit 125 to an external device that provides a service provided by using the feeling of the users.

3. Flow of the Estimation Process

In the following, the flow of the estimation process performed by the estimation system 1 according to the embodiment will be described with reference to FIG. 9. FIG. 9 is a flowchart illustrating an example of the estimation process according to the embodiment. Specifically, FIG. 9 is a flowchart including the process of providing the content in accordance with the estimation process.

As illustrated in FIG. 9, the estimation device 100 acquires user relationship information between a plurality of users (Step S101). For example, the estimation device 100 acquires the user relationship information indicating the similarity relationship between the plurality of users. In the example illustrated in FIG. 1, the estimation device 100 acquires the user relationship information from the user relationship information storage unit 123.

Then, the estimation device 100 estimates the feeling of one of the users based on the feeling information on the similar user similar to the one of the users in the user relationship information (Step S102). For example, the estimation device 100 estimates the feeling of one of the users by propagating the feeling information from the similar user whose feeling has been estimated based on the feeling information to the user similar to the similar user. In the example illustrated in FIG. 1, the estimation device 100 estimates the feeling of the user U3 by propagating the feeling information EL11 from the user U1 from whom the feeling information EL11 has been acquired. In the example illustrated in FIG. 1, the estimation device 100 estimates that the feeling of the user U3 is "joy" by propagating the feeling information EL11 from the user U1 from whom the feeling information EL11 has been acquired.

4. Propagation Based on Clusters

Figure 10:
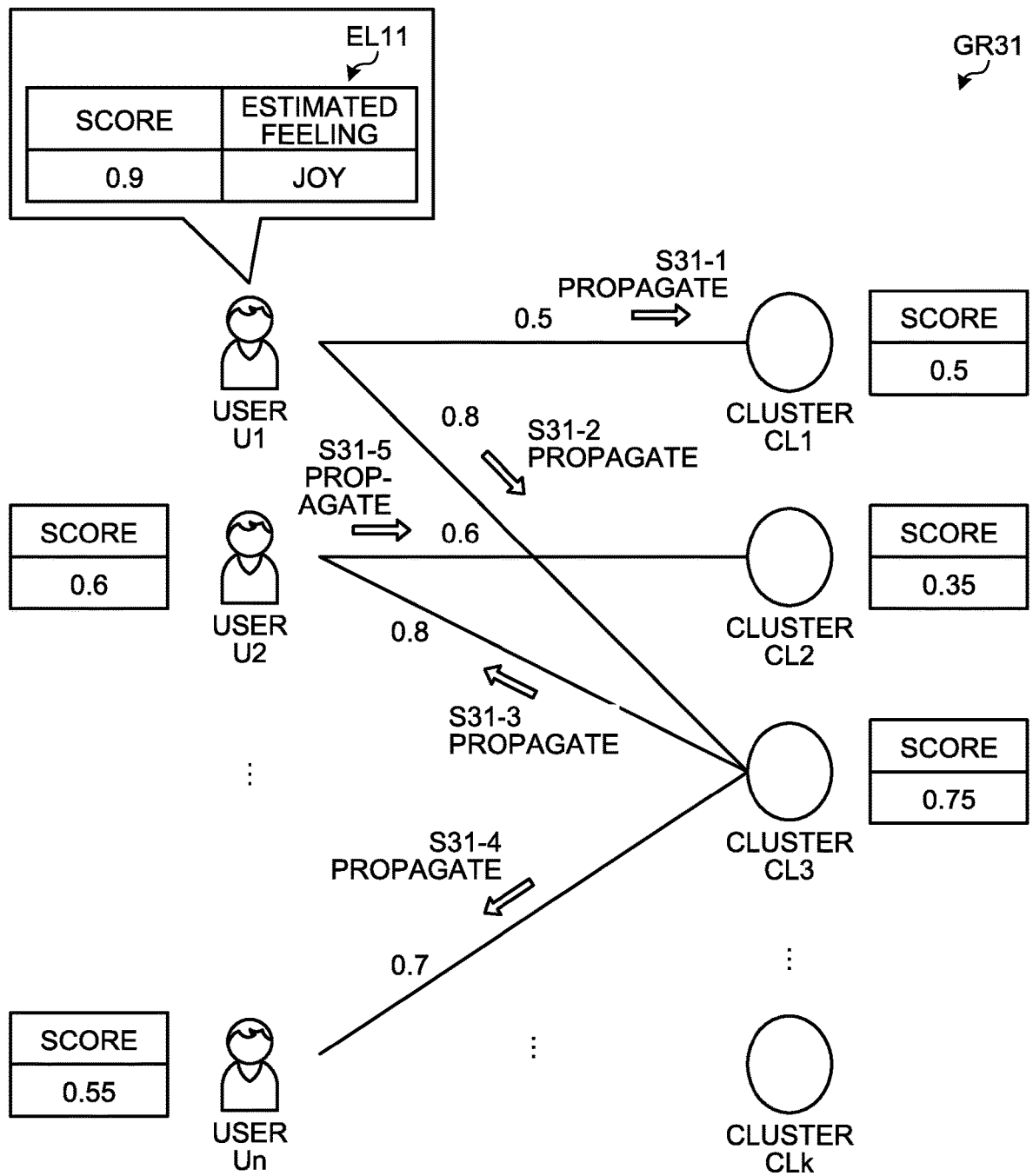
FIG. 10 is a diagram illustrating an example of propagation of clusters according to the embodiment.

Furthermore, the estimation device 100 may also store the feeling information in various modes. For example, the estimation device 100 may also perform propagation of the feeling information via clusters. This point will be described with reference to FIG. 10. FIG. 10 is a diagram illustrating an example of propagation of clusters according to the embodiment. In the example illustrated in FIG. 10, similarly to FIG. 1, a description will be given, as an example, in a case in which the user U1 corresponds to a starting point user and the feeling information EL11 on the user U1 has been estimated. Furthermore, descriptions of the same points as those described in FIG. 1 will appropriately be omitted.

Furthermore, for example, in the example illustrated in FIG. 10, the estimation device 100 creates graph information GR31 based on the user relationship information storage unit 123 and the cluster information storage unit 124. For example, the estimation device 100 creates, as the graph information GR31, a bipartite graph of the user group of the user U1 to the user Un and the cluster group of the cluster CL1 to the cluster CLk.

For example, the users and the clusters connected by the line indicated in the graph information GR31 illustrated in FIG. 10 indicates that the subject user is included in the belonging user of the subject cluster. For example, the user U1 and the cluster CL1 connected by the straight line indicated in the graph information GR31 illustrated in FIG. 10 indicates that the user U1 is included in the belonging user of the cluster CL1. For example, in the graph information GR31 illustrated in FIG. 10, because the user U1 and the cluster CL2 are not directly connected by a line, this indicates that the user U1 is not included in the belonging user of the cluster CL2.

Furthermore, the numerical value attached to the line connected between the users and the clusters indicated in the graph information GR31 illustrated in FIG. 10 indicates the degree of belonging of the users connected by the associated lines with respect to the clusters. For example, the numerical value "0.5" attached to the line connecting the user U1 and the cluster CL1 indicated in the graph information GR31 illustrated in FIG. 10 indicates that the degree of belonging of the user U1 with respect to the cluster CL1 is "0.5". Furthermore, the degree of belonging of the user with respect to the cluster may also be calculated based on various kinds of information. For example, the average value of the degree of similarity between the user U1 and the other users who belongs to the cluster CL1 may also be used. In the example illustrated in FIG. 10, the estimation device 100 uses the degree of belonging of the users with respect to the associated clusters as the propagation coefficients of the feeling information between the users and the clusters.

In the example illustrated in FIG. 10, the estimation device 100 propagates the feeling information on the user to the other users based on the connection relation indicated in the graph information GR31.

For example, by propagating the score of the starting point user to the cluster to which the starting point user belongs, the estimation device 100 propagates the feeling information on the starting point user to the belonging cluster. Furthermore, by propagating the feeling information from the starting point user to the other user who belongs to the belonging cluster in which the feeling information has been propagated, the estimation device 100 propagates the feeling information on the belonging cluster to the other user. In this way, the estimation device 100 propagates the feeling information to each of the users by sequentially propagating the feeling information starting from the starting point user to the users via the belonging clusters.

In the example illustrated in FIG. 10, the estimation device 100 propagates the feeling information on the user U1 to the cluster CL1 that is the belonging cluster of the user U1 (Step S31-1). Furthermore, the estimation device 100 propagates the feeling information on the user U1 to the cluster CL3 that is the belonging cluster of the user U1 (Step S31-2). Furthermore, in the example illustrated in FIG. 1, because the user U1 does not belong to the cluster CL2 or the cluster CLk, the feeling information on the user U1 is not directly propagated to the cluster CL2 and the cluster CLk.

Furthermore, the estimation device 100 propagates the feeling information on the cluster CL3 to the user U2 who is the belonging user of the cluster CL3 (Step S31-3). Furthermore, the estimation device 100 propagates the feeling information on the cluster CL3 to the user Un who is the belonging user of the cluster CL3 (Step S31-4). Furthermore, the estimation device 100 propagates the feeling information on the user U2 to the cluster CL2 that is the belonging cluster of the user U2 (Step S31-5). In this way, the estimation device 100 propagates the feeling information to each of the users via the clusters. Furthermore, calculating the score of each of the users and the clusters and estimating the feeling based on each of the scores are the same as those described in FIG. 1 except that the "degree of belonging" is used instead of the "degree of similarity"; therefore, descriptions thereof will be omitted.

5. Clusters Based on Low-Rank Approximation

Figure 11:
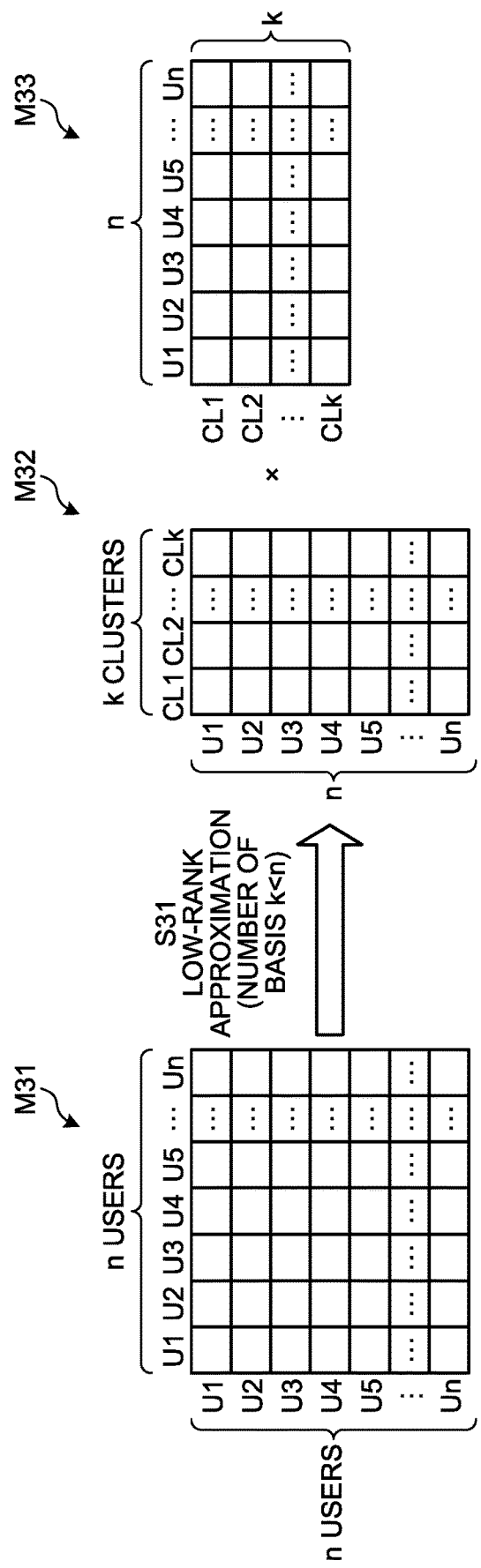
FIG. 11 is a diagram illustrating an example of low-rank approximation according to the embodiment.
Figure 12:
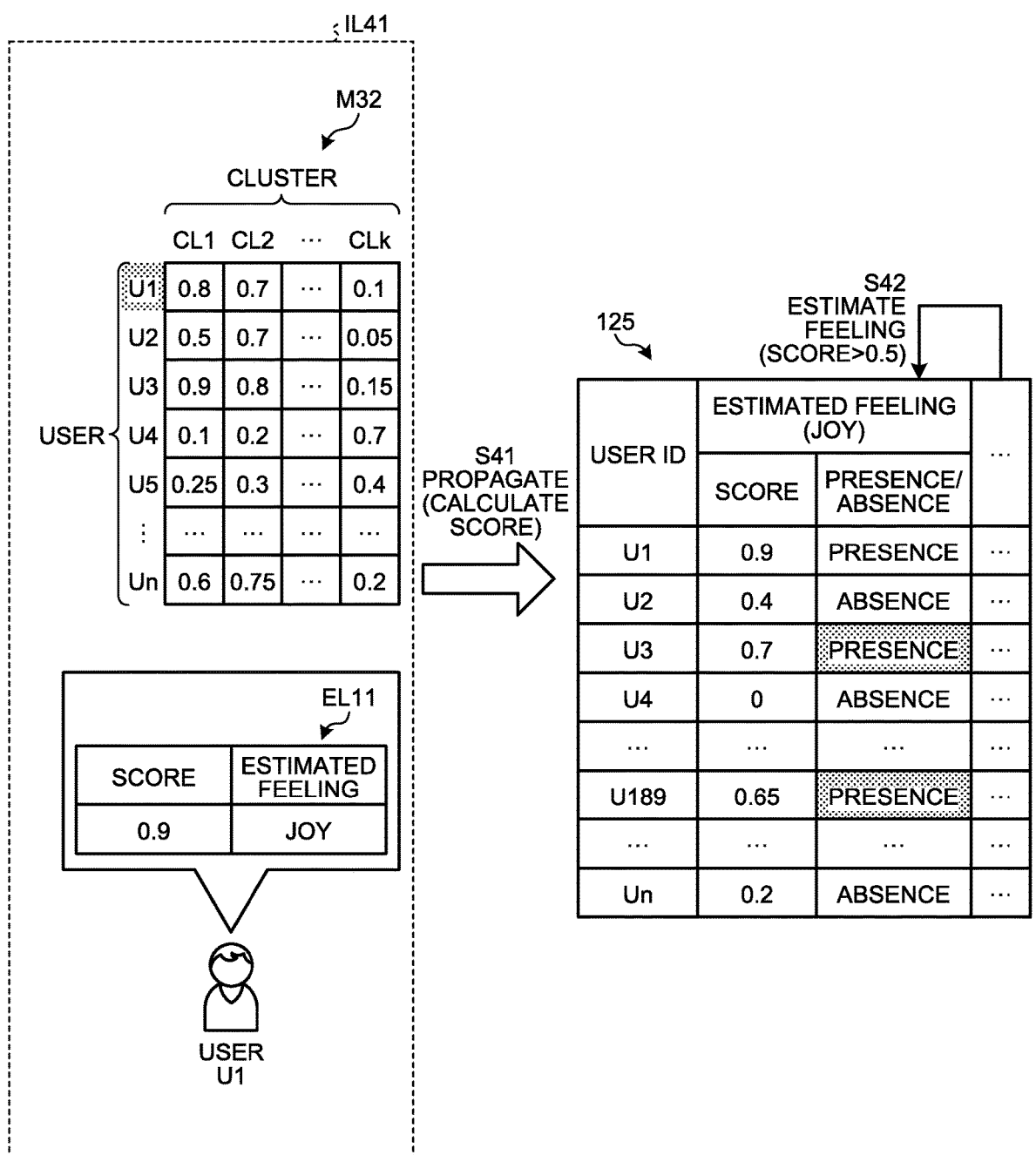
FIG. 12 is a diagram illustrating an example of the estimation process performed by using low-rank approximation according to the embodiment.

Furthermore, the estimation device 100 may also perform the estimation process by using the technology related to low-rank approximation. This point will be described with reference to FIGS. 11 and 12. FIG. 11 is a diagram illustrating an example of low-rank approximation according to the embodiment. Furthermore, FIG. 12 is a diagram illustrating an example of the estimation process performed by using low-rank approximation according to the embodiment. Furthermore, descriptions of the same points as those described in FIG. 1 will appropriately be omitted.

A matrix M31 illustrated in FIG. 11 corresponds to the user relationship information storage unit 123 illustrated in FIG. 1. Although not illustrated in the drawing, in the grid in which the row of "U1" intersects with the column of "U1" or in the grid in which the row of "U2" intersects with the column of "U2" indicated in the matrix M31 illustrated in FIG. 11, "1" is associated. Furthermore, although not illustrated, in the grid in which the row of "U1" intersects with the column of "U2" in the matrix M31 illustrated in FIG. 11, "0.5" is associated. Furthermore, although not illustrated, in the grid in which the grid in which the row of "U1" intersects with the column of "U3" in the matrix M31 illustrated in FIG. 11, "0.75" is associated. As illustrated in FIG. 11, the matrix M31 becomes the matrix with n rows and n columns.

For example, the estimation device 100 performs low-rank approximation on the matrix M31 described above (Step S31). Here, for example, matrix factorization, which is a technique of low-rank approximation, is performed on the matrix M31 and the matrix M31 is factorized into the form of a product of two matrices with the rank lower than the matrix M31.

In the example illustrated in FIG. 11, the estimation device 100 performs matrix factorization by using, as the number of basis, a numerical value "k" smaller than the numerical value "n" indicating the number of users. Specifically, by performing matrix factorization, the matrix M31 is factorized into the form of a product of the matrix M32 in which the number of columns is less than that of the matrix M31 (hereinafter, sometimes referred to as a "first matrix M32") and a matrix M33 in which the number of rows is less than that of the matrix M31 (hereinafter, sometimes referred to as a "second matrix M33").

FIG. 11 is a diagram conceptually illustrating the matrix M31 to the matrix M32. As described above, if the number of basis is set to be "k (<n)", the matrix M31 is factorized, by low-rank approximation, into the form of a product of the first matrix M32 with n rows and k columns and the second matrix M33 with k rows and n columns. In this way, the matrix M31 is factorized into the form of a product of the first matrix M32 and the second matrix M33 with the rank lower than the matrix M31. Furthermore, it is assumed that the process of low-rank approximation is appropriately performed based on a known technique, such as non-negative matrix factorization; therefore, a description thereof in details will be omitted.

By performing low-rank approximation described above, in the case of the first matrix M32 with n rows and k columns, i.e., the user U1 to the user Un belong to k clusters of the clusters CL1 to CLk, the same information as that indicating the degree of belonging of each user with respect to each cluster is created. Furthermore, the estimation device 100 may also change the value of each element in the first matrix M32 in accordance with the degree of similarity between the users. For example, the estimation device 100 may also compare the vector of the (row) of the user U1 with the vector of the (row) of the user U2 and change the value of each element such that the vectors are associated with the degree of similarities of the user U1 and the user U2.

Then, as illustrated in FIG. 12, the estimation device 100 performs a process by using information group IL41 including the matrix M32 created by performing low-rank approximation. In the example illustrated in FIG. 12, similarly to FIG. 1, a description will be given of a case, as an example, in which the user U1 is a starting point user and the feeling information EL11 on the user U1 has been estimated.

The estimation device 100 propagates the feeling information based on the degree of similarity of the vector of the row associated with each of the users (Step S41). The estimation device 100 may also acquire the degree of similarity of the vector of the row associated with each of the users by using various kinds of calculation, such as cosine similarity or an inner product.

In the example illustrated in FIG. 1, the estimation device 100 propagates the feeling information on the user U1 to the other users by calculating the score of the other users based on the score of the user U1 and the degree of similarity between the vector of the user U1 and the vector of the other users. Specifically, the estimation device 100 calculates the score of each of the users associated with the estimated feeling "joy" such as that indicated by the feeling information storage unit 125. For example, the estimation device 100 may also calculate the score of the other user who becomes the propagation destination based on the value obtained by multiplying the score of the user who becomes the propagation source of the feeling information by the degree of similarity of the vector between the users.

Then, the estimation device 100 estimates the feeling of each of the users (Step S42). For example, the estimation device 100 estimates, based on the score associated with the estimated feeling of each of the users, whether each of the users has the estimated feeling. In the example illustrated in FIG. 1, based on the score of each of the users associated with the estimated feeling (joy) stored in the feeling information storage unit 125, the estimation device 100 estimates whether the feeling of each of the users is "joy". Specifically, if the score of the users each associated with the estimated feeling (joy) is greater than the threshold "0.5", the estimation device 100 estimates that the feeling of the subject users is "joy". Furthermore, if the score of the users each associated with the estimated feeling (joy) is equal to or less than the threshold "0.5", the estimation device 100 estimates that the feeling of the subject users is not "joy".

In this way, the estimation device 100 factorizes the matrix M31 that is based on the similarity between users into the form of a product of the first matrix M32 with n rows and k columns and the second matrix M33 with k rows and n columns and estimates the feeling of each of the users by using the first matrix M32. In this case, the first matrix M32 is associated with the matrix with n users and k clusters. Specifically, the first matrix M32 corresponds to the matrix formed of the rows of the user U1 to the user Un and the columns of the clusters CL1 to CLk. Accordingly, by estimating the feeling of the users by using the first matrix M32 created based on low-rank approximation described above, the estimation device 100 can appropriately estimate the feeling of the users, similar to when other cluster information is used.

6. Effects

As described above, the estimation device 100 according to the embodiment includes the acquiring unit 131 and the estimation unit 133. The acquiring unit 131 acquires user relationship information indicating a similarity relationship between a plurality of users. The estimation unit 133 estimates, based on feeling information on a similar user who is similar to one of the users in the user relationship information acquired by the acquiring unit 131, a feeling of the one of the users.

In this way, the estimation device 100 according to the embodiment can appropriately estimate a feeling of the users by estimating the feeling of the one of the users based on the feeling information on a similar user who is similar to the one of the users in the user relationship information.

Furthermore, in the estimation device 100 according to the embodiment, the estimation unit 133 estimates the feeling of the one of the users based on the feeling information on the one of the users.

In this way, the estimation device 100 according to the embodiment can appropriately estimate the feeling of the users by estimating the feeling of the one of the users based on the feeling information on the one of the users, in addition to the feeling information on the similar user.

Furthermore, in the estimation device 100 according to the embodiment, the estimation unit 133 estimates the feeling of the one of the users based on the user relationship information including information related to the degree of similarity that indicates the similarity between the users and based on the feeling information on the similar user who has the degree of similarity between the one of the users equal to or greater than a predetermined threshold.

In this way, the estimation device 100 according to the embodiment can appropriately estimate the feeling of the users based on the user relationship information including information related to the degree of similarity that indicates the similarity between the users and based on the feeling information on the similar user who has the degree of similarity between the one of the users equal to or greater than a predetermined threshold.

Furthermore, in the estimation device 100 according to the embodiment, the estimation unit 133 estimates the feeling of the one of the users by performing a process of propagating the feeling information from the similar user whose feeling has been estimated based on the feeling information to the user who is similar to the similar user.

In this way, the estimation device 100 according to the embodiment can appropriately estimate the feeling of the users by performing the process of propagating the feeling information from the similar user whose feeling has been estimated based on the feeling information to the user who is similar to the similar user.

Furthermore, in the estimation device 100 according to the embodiment, the estimation unit 133 estimates the feeling of the one of the users based on the user relationship information including cluster information obtained by clustering the users and based on the feeling information on the similar user who belongs to a common cluster to which the one of the users belongs.

In this way, the estimation device 100 according to the embodiment can appropriately estimate the feeling of the users by estimating the feeling of the one of the users based on the user relationship information including cluster information obtained by clustering the users and based on the feeling information on the similar user who belongs to a common cluster to which the one of the users belongs.

Furthermore, in the estimation device 100 according to the embodiment, the estimation unit 133 estimates the feeling of the one of the users by performing a process of propagating the feeling information from the similar user whose feeling has been estimated based on the feeling information to the cluster to which the similar user belongs and propagating the feeling information on the cluster from the cluster to the user who belongs to the cluster.

In this way, the estimation device 100 according to the embodiment can appropriately estimate the feeling of the users by estimating the feeling of the one of the users by performing the process of propagating the feeling information from the similar user whose feeling has been estimated based on the feeling information to the user who is similar to the similar user by interposing a cluster.

Furthermore, in the estimation device 100 according to the embodiment, the estimation unit 133 estimates the feeling of the one of the users based on a plurality of matrices obtained by performing low-rank approximation on a matrix that indicates the degree of similarity between the users created based on the user relationship information.

In this way, the estimation device 100 according to the embodiment can appropriately estimate the feeling of the users based on the plurality of matrices obtained by performing low-rank approximation on the matrix that indicates the degree of similarity between the users created based on the user relationship information.

Furthermore, in the estimation device 100 according to the embodiment, the acquiring unit 131 acquires the user relationship information created based on first information related to each of the plurality of users. The estimation unit 133 estimates the feeling of the one of the users based on the feeling information on the similar user estimated based on second information that is related to the similar user and that has a type different from that of the first information.

In this way, the estimation device 100 according to the embodiment can appropriately estimate the feeling of the users by estimating the feeling of the one of the users based on the feeling information on the similar user estimated based on the second information that is related to the similar user and that has a type different from that of the first information.

Furthermore, in the estimation device 100 according to the embodiment, the estimation unit 133 estimates the feeling of the one of the users based on the feeling information on the similar user estimated based on the second information in which the connection with a feeling is higher than that of the first information.

In this way, the estimation device 100 according to the embodiment can appropriately estimate the feeling of the users by estimating the feeling of the one of the users based on the feeling information on the similar user estimated based on the second information in which the connection with a feeling is higher than that of the first information.

Furthermore, in the estimation device 100 according to the embodiment, the estimation unit 133 estimates the feeling of the one of the users based on the feeling information on the similar user estimated based on the second information including biometric information on the users.

In this way, the estimation device 100 according to the embodiment can appropriately estimate the feeling of the users by estimating the feeling of the one of the users based on the feeling information on the similar user estimated based on the second information including the biometric information on the users.

Furthermore, in the estimation device 100 according to the embodiment, the estimation unit 133 estimates the feeling of the one of the users based on the feeling information on the similar user estimated based on the second information including image information on a captured image of the user.

In this way, the estimation device 100 according to the embodiment can appropriately estimate the feeling of the users by estimating the feeling of the one of the users based on the feeling information on the similar user estimated based on the second information including image information on a captured image of the user.

Furthermore, in the estimation device 100 according to the embodiment, the estimation unit 133 estimates the feeling of the one of the users based on the feeling information on the similar user estimated based on the second information including action information on the users associated with an action with a predetermined type.

In this way, the estimation device 100 according to the embodiment can appropriately estimate the feeling of the users by estimating the feeling of the one of the users based on the feeling information on the similar user estimated based on the second information including action information on the users associated with an action with a predetermined type.

Furthermore, in the estimation device 100 according to the embodiment, the estimation unit 133 estimates the feeling of the one of the users based on the feeling information on the similar user estimated based on the second information that includes, as the action information on the users, at least one piece of input information that was input by the user in a service provided via a network and purchase information indicating a purchase performed by the user.

In this way, the estimation device 100 according to the embodiment can appropriately estimate the feeling of the users by estimating the feeling of the one of the users based on the feeling information on the similar user estimated based on the second information including, as the action information on the users, at least one piece of the input information that was input by the user in a service provided via the network and the purchase information indicating a purchase performed by the user.

Furthermore, in the estimation device 100 according to the embodiment, the estimation unit 133 acquires the user relationship information created based on the first information including the action information that is related to the users and that is other than the action information included in the second information.

In this way, the estimation device 100 according to the embodiment can appropriately estimate the feeling of the users by acquiring the user relationship information created based on the first information including the action information that is related to the users and that is other than the action information included in the second information.

Furthermore, in the estimation device 100 according to the embodiment, the estimation unit 133 acquires the user relationship information created based on the first information that includes attribute information on the users.

In this way, the estimation device 100 according to the embodiment can appropriately estimate the feeling of the users by acquiring the user relationship information created based on the first information that includes attribute information on the users.

7. Hardware Configuration

Figure 13:
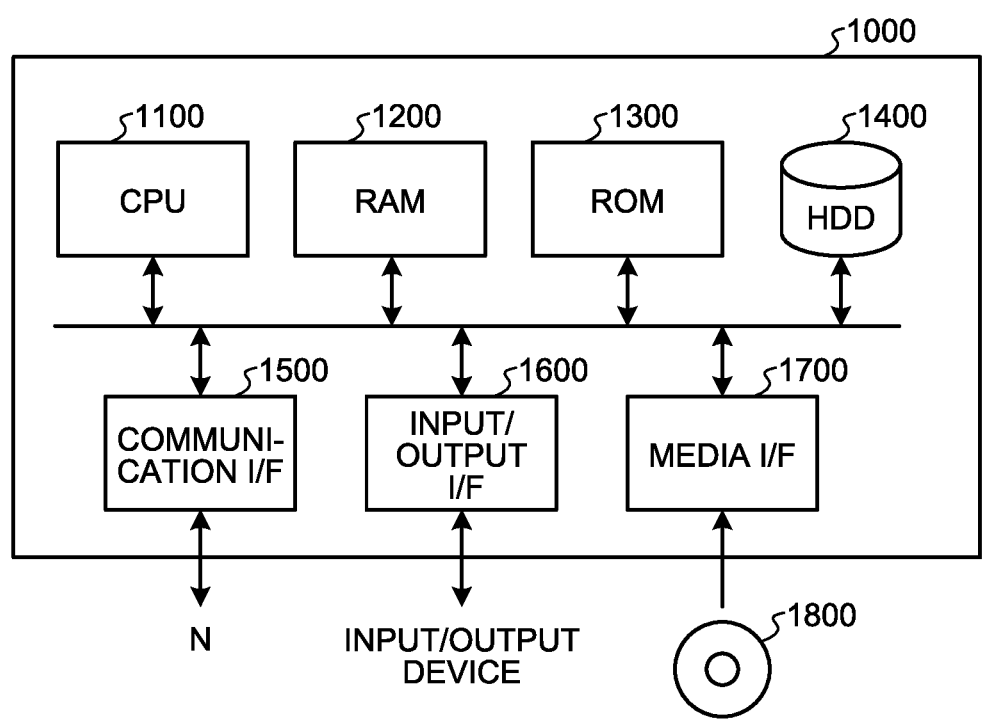
FIG. 13 is a hardware configuration diagram illustrating an example of a computer that implements the function of the estimation device.

The estimation device 100 according to the embodiment described above is implemented by a computer 1000 having the configuration illustrated in, for example, FIG. 13. FIG. 13 is a hardware configuration diagram illustrating an example of the computer that implements the function of the estimation device. The computer 1000 includes a CPU 1100, a RAM 1200, a ROM 1300, a hard disk drive (HDD) 1400, a communication interface (I/F) 1500, an input/output interface (I/F) 1600, and a media interface (I/F) 1700.

The CPU 1100 operates based on a program stored in the ROM 1300 or the HDD 1400 and controls each of the units. The ROM 1300 stores therein a boot program that is executed by the CPU 1100 when the computer 1000 is started up, a program that depends on hardware of the computer 1000, or the like.

The HDD 1400 stores therein a program executed by the CPU 1100, data used by the program, or the like. The communication interface 1500 receives data from other devices via the network N, sends the data to the CPU 1100, and sends the data created by the CPU 1100 to other devices via the network N.

The CPU 1100 controls an output device, such as a display or a printer, or an input device, such as a keyboard or a mouse, via the input/output interface 1600. The CPU 1100 acquires data from the input device via the input/output interface 1600. Furthermore, the CPU 1100 outputs the created data to the output device via the input/output interface 1600.

The media interface 1700 reads a program or data stored in a recording medium 1800 and provides the program or the data to the CPU 1100 via the RAM 1200. The CPU 1100 loads the program from the recording medium 1800 into the RAM 1200 via the media interface 1700 and executes the loaded program. The recording medium 1800 is, for example, an optical recording medium, such as a digital versatile disc (DVD) or a phase change rewritable disk (PD), a magneto optical recording medium, such as a magneto-optical disk (MO), a tape medium, a magnetic recording medium, a semiconductor memory, or the like.

For example, when the computer 1000 functions as the estimation device 100, the CPU 1100 in the computer 1000 implements the functions of the control unit 130 by executing a program loaded into the RAM 1200. The CPU 1100 in the computer 1000 reads the program from the recording medium 1800 and executes the program. For another example, the program may also be acquired from other devices via the network N.

In the above, embodiments of the present invention have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

8. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, embodiments and modifications described above may be appropriately used in combination as long as the processes do not conflict with each other.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to appropriately estimate the feeling of users.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An estimation device comprising:
a memory storing user information on a plurality of users; and
a processor operatively coupled to the memory, the processor being programmed to:
acquire via a social networking service, user-inputted information inputted into respective terminal devices corresponding to the plurality of users by the plurality of users respectively indicating feelings of each user of the plurality of users as the user information;
separate the plurality of users into a plurality of clusters using a k-means clustering technique based on the user information;
generate vectors for each of the users from the user information of the respective user;
create user relationship information between the plurality of users based on a respective degree of similarity between the vectors of each of the users;
estimate a feeling of a first user of the plurality of users, which does not have feeling information, based on feeling information of at least one similar user of the plurality of users who is similar to the first user of the plurality of users in the created user relationship information and belongs to a common cluster, of the plurality of clusters, to which the first user belongs, the feeling information including heartbeat or blood pressure data of the user, the feeling of the user being estimated based on (i) a difference between the heartbeat or blood pressure and a threshold value or rate of change, and (ii) the acquired user-inputted information acquired via the social networking service;
generate and transmit the estimated feeling of the first user to an external service provider, which provides a service to the first user based on the estimated feeling; and
receive the service for the first user from the external service provider.

2. The estimation device according to claim 1, wherein the processor is programmed to estimate the feeling of the first user based on the user relationship information, which includes information related to the degree of similarity that indicates the similarity between the plurality of users and based on the feeling information of the similar user who has the degree of similarity with the first user of the plurality of users equal to or greater than a predetermined threshold.

3. The estimation device according to claim 1, wherein the processor is programmed to estimate the feeling of the first user of the plurality of users by performing a process of propagating the feeling information of the similar user whose feeling has been estimated based on the feeling information to the first user.

4. The estimation device according to claim 1, wherein the processor is programmed to estimate the feeling of the first user of the plurality of users by performing a process of propagating the feeling information from the similar user whose feeling has been estimated based on the feeling information to a cluster of the plurality of clusters to which the similar user belongs and propagating the feeling information on the cluster, from the cluster to the first user who belongs to the cluster.

5. The estimation device according to claim 1, wherein the processor is programmed to estimate the feeling of the first user of the plurality of users based on a plurality of matrices obtained by performing low-rank approximation on a matrix that indicates the degree of similarity between the users, the matrix being created based on the user relationship information.

6. The estimation device according to claim 1, wherein the processor is further programmed to estimate the feeling information of the similar user based on image information on a captured image of the first user.

7. The estimation device according to claim 1, wherein the processor is further programmed to estimate the feeling information of the similar user based on action information on the plurality of users associated with an action of a predetermined type.

8. The estimation device according to claim 7, wherein the action information includes at least one piece of the user inputted information that was input by the first user via the social networking service and purchase information indicating a purchase performed by the first user.

9. The estimation device according to claim 7, wherein the processor is programmed to create the user relationship information based on action information that is different from the action information used to estimate the feeling information of the similar user.

10. The estimation device according to claim 1, wherein the processor is programmed to create the user relationship information based on attribute information on the plurality of users.

11. An estimation method performed by a computer comprising:
acquiring, via a social networking service, user-inputted information inputted into respective terminal devices corresponding to a plurality of users by the plurality of users respectively indicating feelings of each of the plurality of users as user information;
storing the acquired user information on the plurality of users;
separating the plurality of users into a plurality of clusters using a k-means clustering technique based on the user information;
generating vectors for each of the users from the user information of the respective user;
creating user relationship information between the plurality of users based on a respective degree of similarity between the vectors of each of the users;
estimating a feeling of a first user of the plurality of users, which does not have feeling information, based on the feeling information of at least one similar user of the plurality of users who is similar to the first user of the plurality of users in the created user relationship information and belongs to a common cluster, of the plurality of clusters, to which the first user belongs, the feeling information including heartbeat or blood pressure data of the user, the feeling of the user being estimated based on (i) a difference between the heartbeat or blood pressure and a threshold value or rate of change, and (ii) the acquired user-inputted information acquired via the social networking service;
generating and transmitting the estimated feeling of the first user to an external service provider, which provides a service to the first user based on the estimated feeling; and
receiving the service for the first user from the external service provider.

12. A non-transitory computer-readable recording medium having stored therein an estimation program that causes a computer to execute a process comprising:
acquiring, via a social networking service, user-inputted information inputted into respective terminal devices corresponding to a plurality of users by the plurality of users respectively indicating feelings of each of the plurality of users as user information;
storing the acquired user information on the plurality of users;
separating the plurality of users into a plurality of clusters using a k-means clustering technique based on the user information;

generating vectors for each of the users from the user information of the respective user;

creating user relationship information between the plurality of users based on a respective degree of similarity between the vectors of each of the users;

estimating a feeling of a first user of the plurality of users, which does not have feeling information, based on the feeling information of at least one similar user of the plurality of users who is similar to the first user of the plurality of users in the created user relationship information and belongs to a common cluster, of the plurality of clusters, to which the first user belongs, the feeling information including heartbeat or blood pressure data of the user, the feeling of the user being estimated based on (i) a difference between the heartbeat or blood pressure and a threshold value or rate of change, and (ii) the acquired user-inputted information acquired via the social networking service;

generating and transmitting the estimated feeling of the first user to an external service provider, which provides a service to the first user based on the estimated feeling; and receiving the service for the first user from the external service provider.

* * * * *